(12) United States Patent
Wilkoski

(10) Patent No.: US 12,304,437 B2
(45) Date of Patent: May 20, 2025

(54) PORTABLE UNDERSPRAYER

(71) Applicant: Evan Wilkoski, Utica, OH (US)

(72) Inventor: Evan Wilkoski, Utica, OH (US)

( * ) Notice: Subject to any disclaimer, the term of this patent is extended or adjusted under 35 U.S.C. 154(b) by 273 days.

(21) Appl. No.: 17/969,677

(22) Filed: Oct. 19, 2022

(65) Prior Publication Data
US 2024/0132024 A1  Apr. 25, 2024
US 2024/0227740 A9  Jul. 11, 2024

(51) Int. Cl.
*B60S 3/04* (2006.01)
*B05B 15/658* (2018.01)

(52) U.S. Cl.
CPC .............. *B60S 3/04* (2013.01); *B05B 15/658* (2018.02)

(58) Field of Classification Search
USPC .......................................................... 285/33
See application file for complete search history.

(56) References Cited

U.S. PATENT DOCUMENTS

2007/0246108 A1* 10/2007 Conway .................. F16L 37/34
  137/614.06
2011/0155192 A1*  6/2011 Ahmad ..................... B60S 1/68
  134/56 R

FOREIGN PATENT DOCUMENTS

CN          108819913 A  * 11/2018  .............. B60S 3/042

OTHER PUBLICATIONS

CN_108819913 translation (Year: 2018).*

* cited by examiner

*Primary Examiner* — Rita P Adhlakha
(74) *Attorney, Agent, or Firm* — Furr Law Firm; Jeffrey M. Furr

(57) ABSTRACT

The invention is an Undersprayer for automotive enthusiasts and people who like to keep their vehicle clean. It can also be used by off-road enthusiasts to clear mud off the bottom of off-road vehicles. The system requires that the end-user have a power washer and an air compressor. The device has a control panel, an upright frame, a motor and pump system, a pressure line and a spray mat assembly. With the supplied adapters the user plugs in the power washer and air compressor into the control panel. The user then plugs in the supplied high pressure line into the control panel outlet port. This line connects to the spray mat that lays in the driveway.

14 Claims, 24 Drawing Sheets

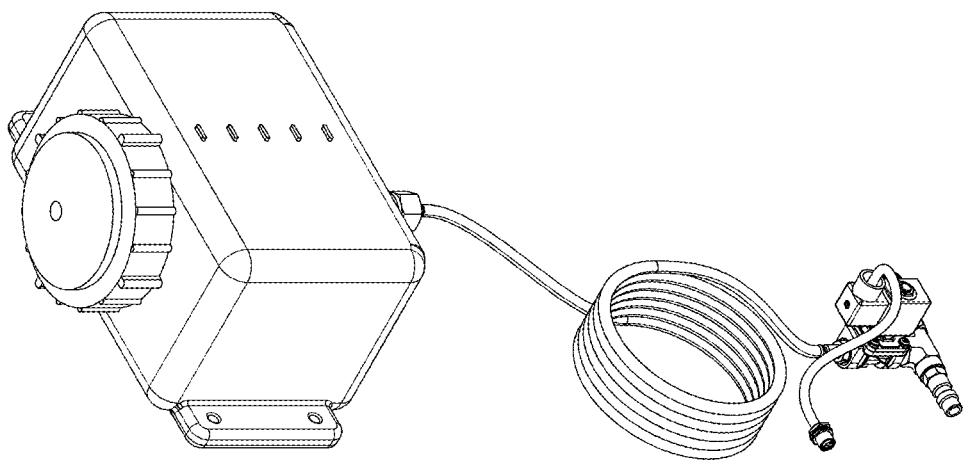
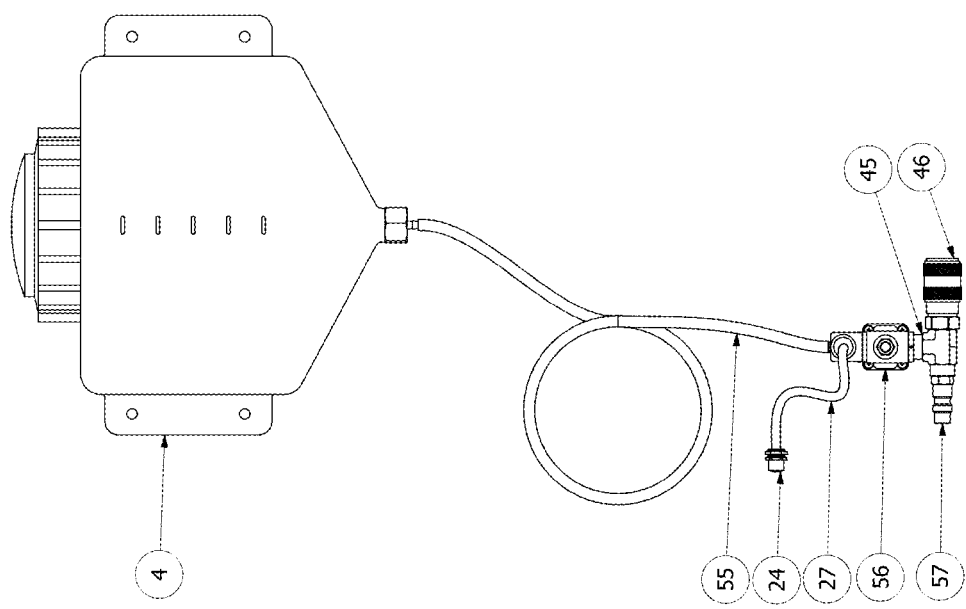
FIGURE 10

PORTABLE UNDERSPRAYER

CROSS-REFERENCES TO RELATED APPLICATIONS

None.

STATEMENT AS TO RIGHTS TO INVENTIONS MADE UNDER FEDERALLY SPONSORED RESEARCH AND DEVELOPMENT

None

FIELD OF THE INVENTION

This device refers to the field of under-sprayers for vehicles in more particularity under-sprayers that are portable.

BACKGROUND OF THE INVENTION

The existing car washers has the following disadvantages of having large volume and poor portability as well as not doing a good job of washing the underside of the vehicle. There is also a lack of portability. The present invention aims to solve these problems.

Thus, there remains a need for improved undercarriage washers for vehicles that are portable, versatile, eliminate the need for the driver to exit the cab to confirm cleaning, eliminate the possibility that the driver will be sprayed with the washer fluid, and that provide tactile feedback that full cleaning of the undercarriage has occurred.

There remains room for improvement in the art.

SUMMARY OF THE INVENTION

This proposed device is an Under-sprayer automotive undercarriage cleaning system designed to be a convenient way to remove salt, mud, or other buildup from the bottom of a vehicle at the press of a button.

The system was created as a way to get clean the undercarriage of a vehicle. Currently, the only way to do this is to go to a standard commercial car wash and drive back home on salty roads again, or spray the car off by hand and deal with the freezing water lines/power washer.

Undersprayer is for automotive enthusiasts and people who like to keep their vehicle clean. It can also be used by off-road enthusiasts to clear mud off the bottom of off-road vehicles. The system requires that the end-user have a power washer and an air compressor. With the supplied adapters the user plugs in the power washer and air compressor into the control panel. The user then plugs in the supplied high pressure line into the control panel outlet port. This line connects to the Spray Mats that lays on the ground or driveway. The system comes with 2 remotes both with ON and OFF.

The device has a control panel, a pressure line and a spray mat assembly.

BRIEF DESCRIPTION OF DRAWINGS

Without restricting the full scope of this invention, the preferred form of this invention is illustrated in the following drawings in which:

FIG. 10 shows the chemical tank and Chemical Injector Fluid Hose;
FIGS. 21a, 22b, and 22c shows a smaller spray mat being used with a vehicle;
and
FIGS. 22a, 22b and 22c shows an overview of a smaller spray mat being used with a vehicle.

LIST OF PARTS

Figure 1:
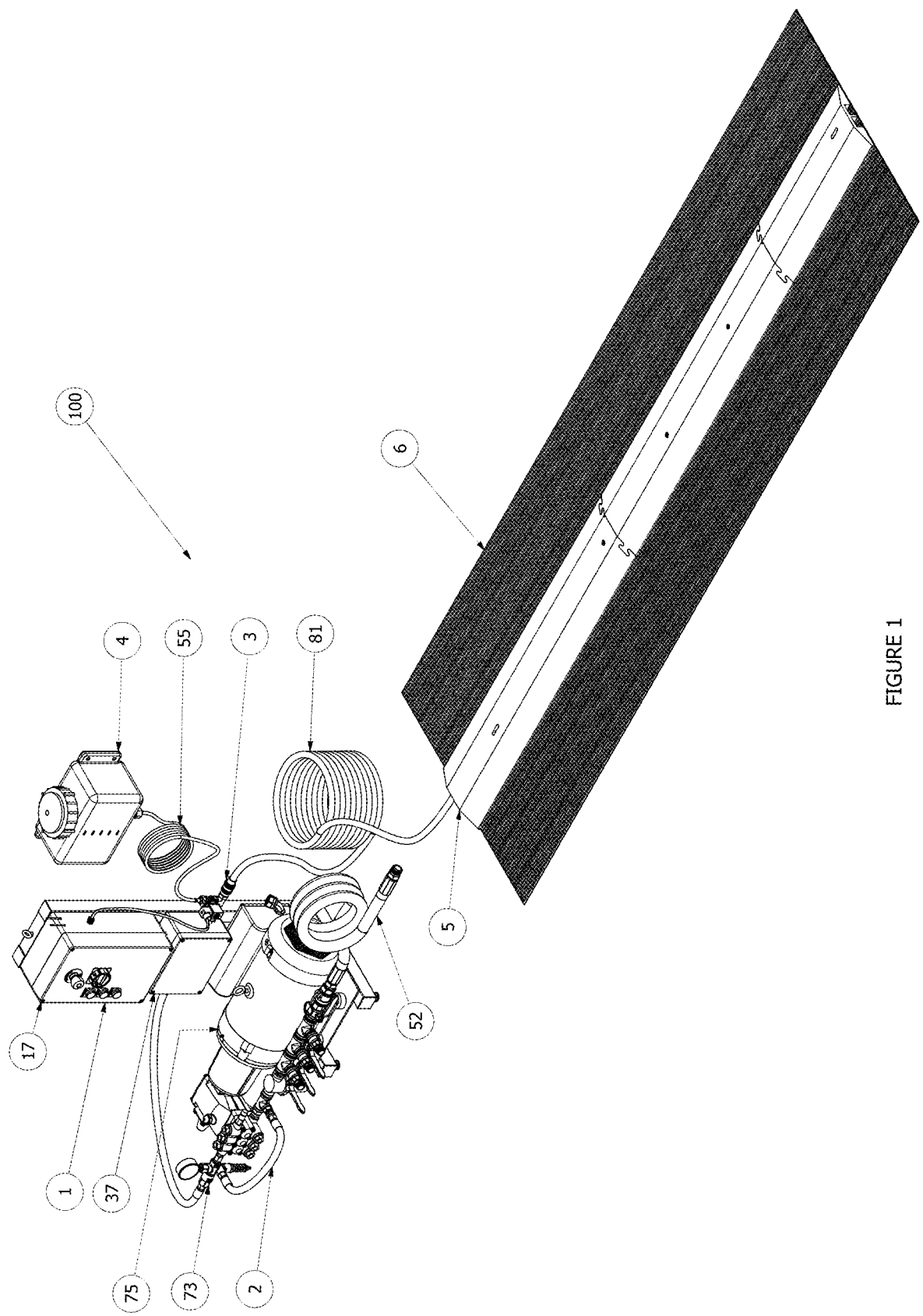
FIG. 1 shows the device with its components.

1 Pro Electro/Mechanical System Commercial Grade Control Panel
2 Power Unit
3 Chemical Injector
4 Chemical Tank
5 Pro 9 ft Spray Mat
6 Traction Pad
7 Residential Electro/Mechanical System
8 Residential 3 ft Spray Mat
9 Pro Mat Section 3
10 Pro Mat Section 2
11 Pro Mat Section 1
12 DC Power Supply
13 Radio Frequency Relay Boards
14 Radio Antenna(s)
15 Emergency Stop Switch
16 Electrical Enclosure
17 CPU
18 Power switch
19 Relay Bank
20 "SPRAY ON" system running indicator lamp
21 "PURGING" system clearing water lines indicator lamp
22 "SYSTEM READY" system in standby and ready for operation indicator lamp
23 Chemical Injector Plug Male
24 Chemical Injector Plug Female
25 Power Input Cord Grip
26 Motor Power Output Cord Grip
27 Chemical Injector Electrical Cable
28 Chemical Injector Control Solenoid Industrial Relay
29 Air Control Solenoid Industrial Relay
30 Water Control Solenoid Industrial Relay
31 Power Input Breaker
32 Motor Contactor
33 Low Amp Breakers
34 High Amp Relays 35 Mechanical to Electrical Box Data Power Cable for Solenoids
36 Mechanical to Electrical Box Data Power Cable Cord Grip
37 Mechanical Enclosure
38 Air Control Solenoid
39 High Pressure, Stainless Steel, ¼" Pipe for air
40 Industry Standard Air Hose Inlet
41 Swivel ⅜" High Pressure Power Washer Connection Input
42 Water Control Solenoid
43 ⅜" Pipe
44 Check Valve ⅜"
45 Tee
46 Quick Disconnect
47 Terminal Bank
48 Residential System Mounting Feet
49 Low Amp Breaker
50 Residential 5-15R Receptacle for connecting 2 pressure washers
51 Residential system Main system breaker
52 Power Washer Connection Input
53 Check Valve ¼"
54 Electro/Mechanical Enclosure For Residential System
55 Chemical Injector Fluid Hose
56 Chemical Injector Solenoid
57 Chemical Injector Input Quick Disconnect
60 Pro Mat Module 1
61 Spray Nozzle
62 ⅛ " 90 Degree Fitting
63 Reducer Fitting
64 Bushing For Connecting Next Mat Module OR End Plug
67 Galvanized Pipe Clamp
68 Sheet Metal Screw Stainless
69 Pro Mat Module 2
70 Pro Mat Module 3
72 Residential Mat
73 Pump With Supporting Equipment
74 Water Inlet Manifold
75 Motor with Supporting Equipment
76 Mounting Frame Steel weldment frame for mounting power unit and Pro control panel
81 Mat Hose
82 Water Source Hose
83 ⅜" 90 Degree Fitting

DETAILED DESCRIPTION OF THE PREFERRED EMBODIMENT

There are a number of significant design features and improvements incorporated within the invention.

The current invention is an under-sprayers for vehicles and system.

As shown in FIGS. 1-22c, the current invention, a device 100, which is an Underspayer automotive undercarriage cleaning system. It is designed to be a convenient way to remove salt, mud, or other buildup from the bottom of a vehicle at the press of a button.

As shown in FIG. 1, the device 100 has a number of major components. The device 100 has a Pro Electro/Mechanical System Commercial grade control panel 1, a Chemical Injector 3, a Chemical Tank 4, a Chemical Hose 55, a Mat Hose 81, a Pro 9 ft Spray Mat 5, and a Traction Pad 6.

FIG. 1 also shows a Pump With Supporting Equipment 73 and a Motor with Supporting Equipment 75. This configuration has multiple (3) Spray Mats 5 connected to each other.

Figure 2:
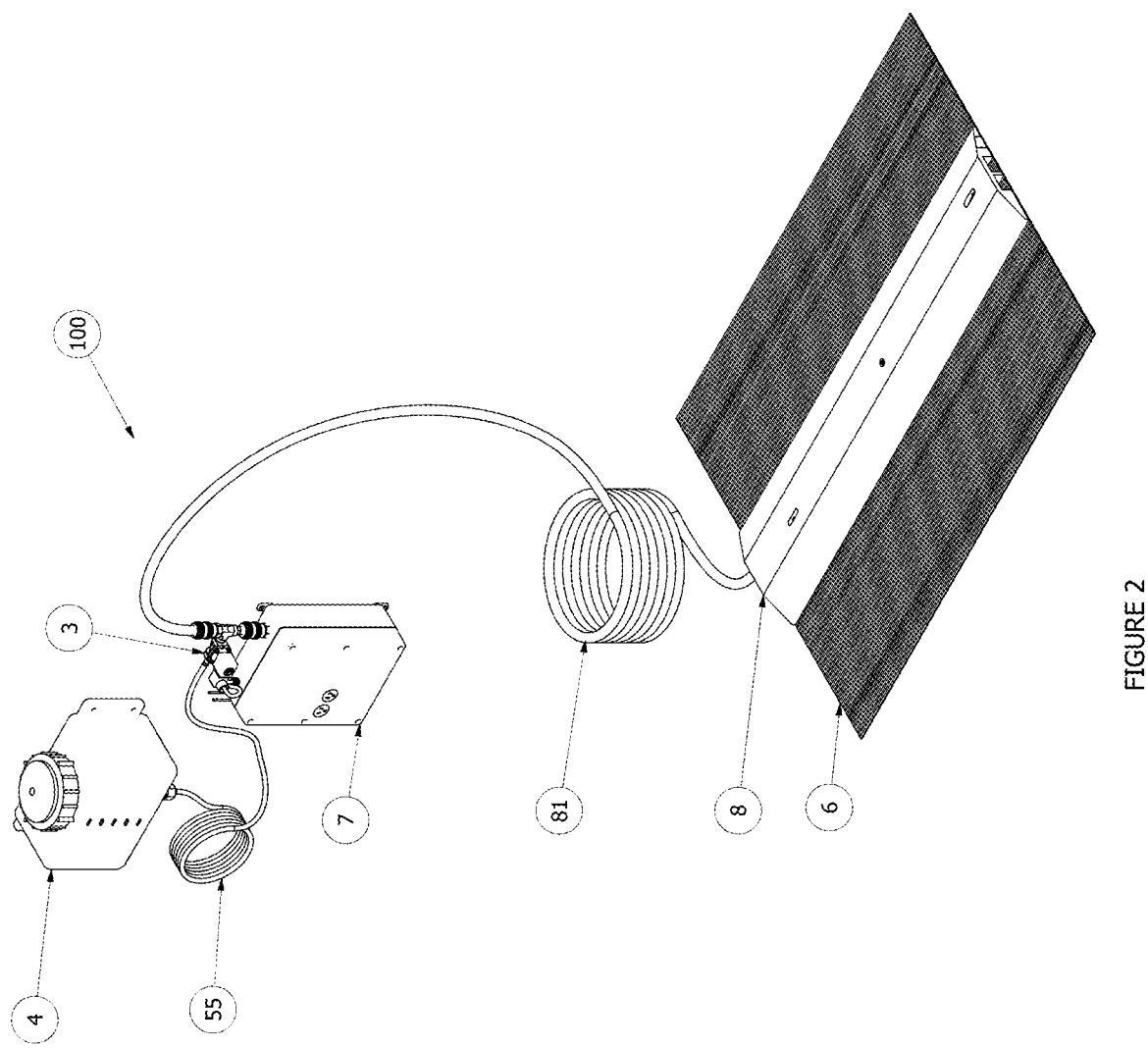
FIG. 2 shows another view of the device with its main components.

FIG. 2 shows the device 100 with a single Spray Mat 5. The multiple Spray Mat 5 system can be viewed as a commercial version of the device 100 and a single Spray Mat 5 can be viewed as a home consumer version.

Figure 3:
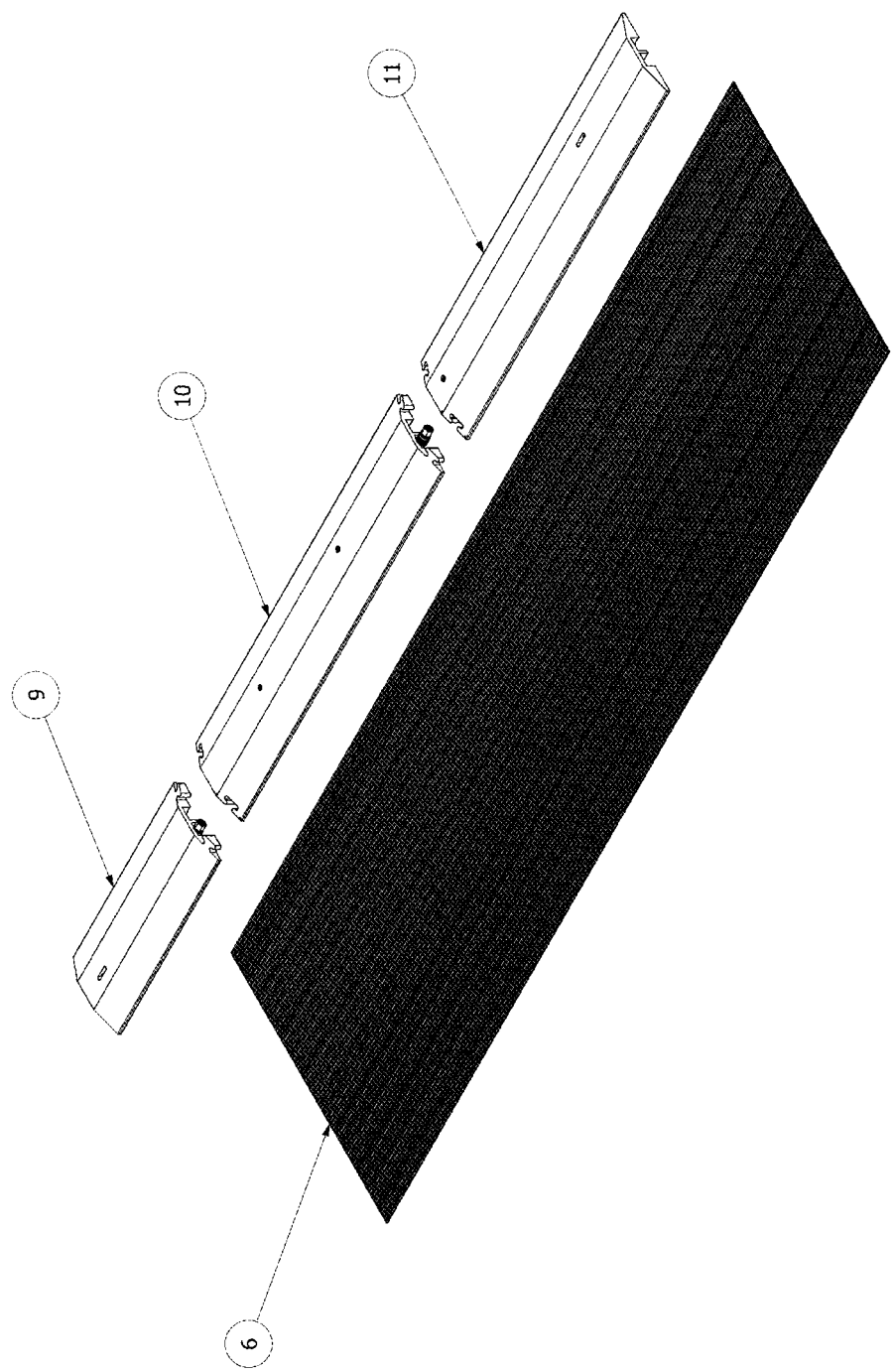
FIG. 3 shows the Spray Mats and traction pad.
Figure 4:
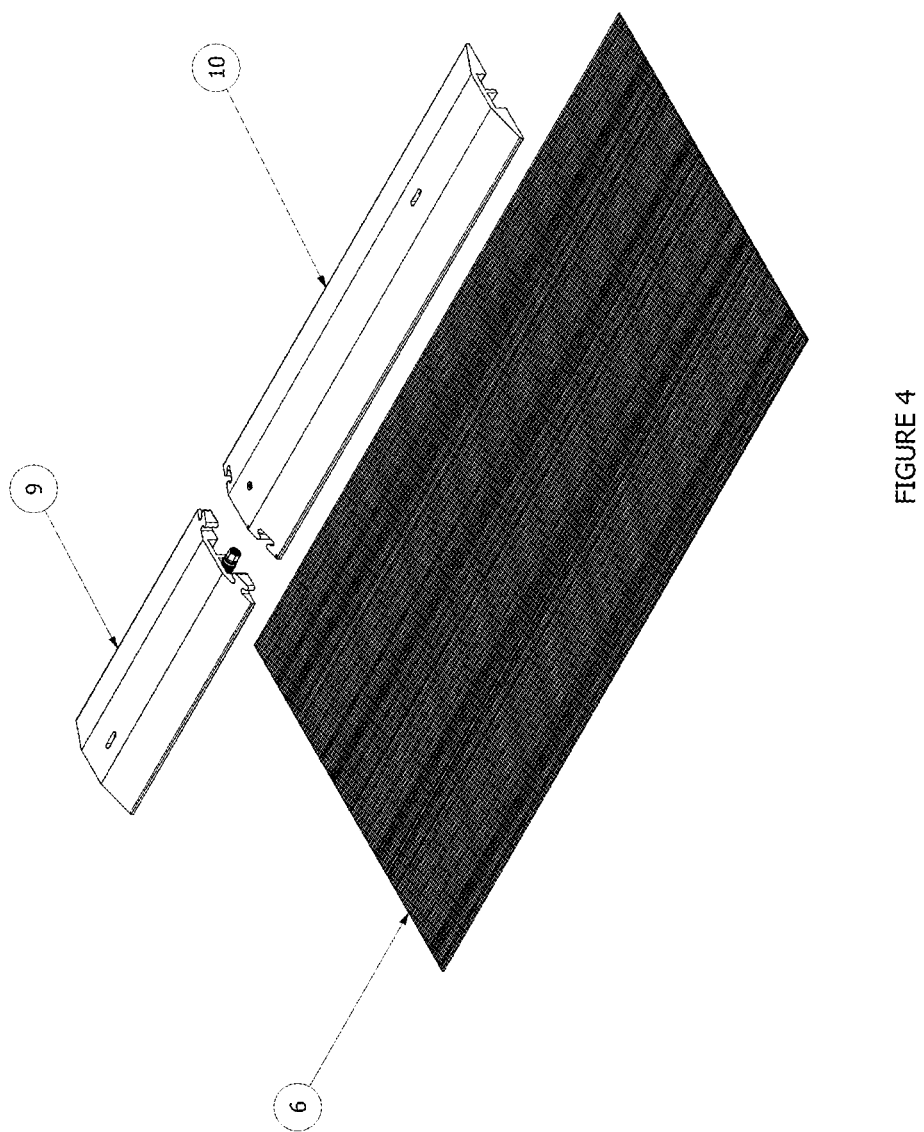
FIG. 4 shows another view of the Spray Mats and traction pad.
Figure 5:
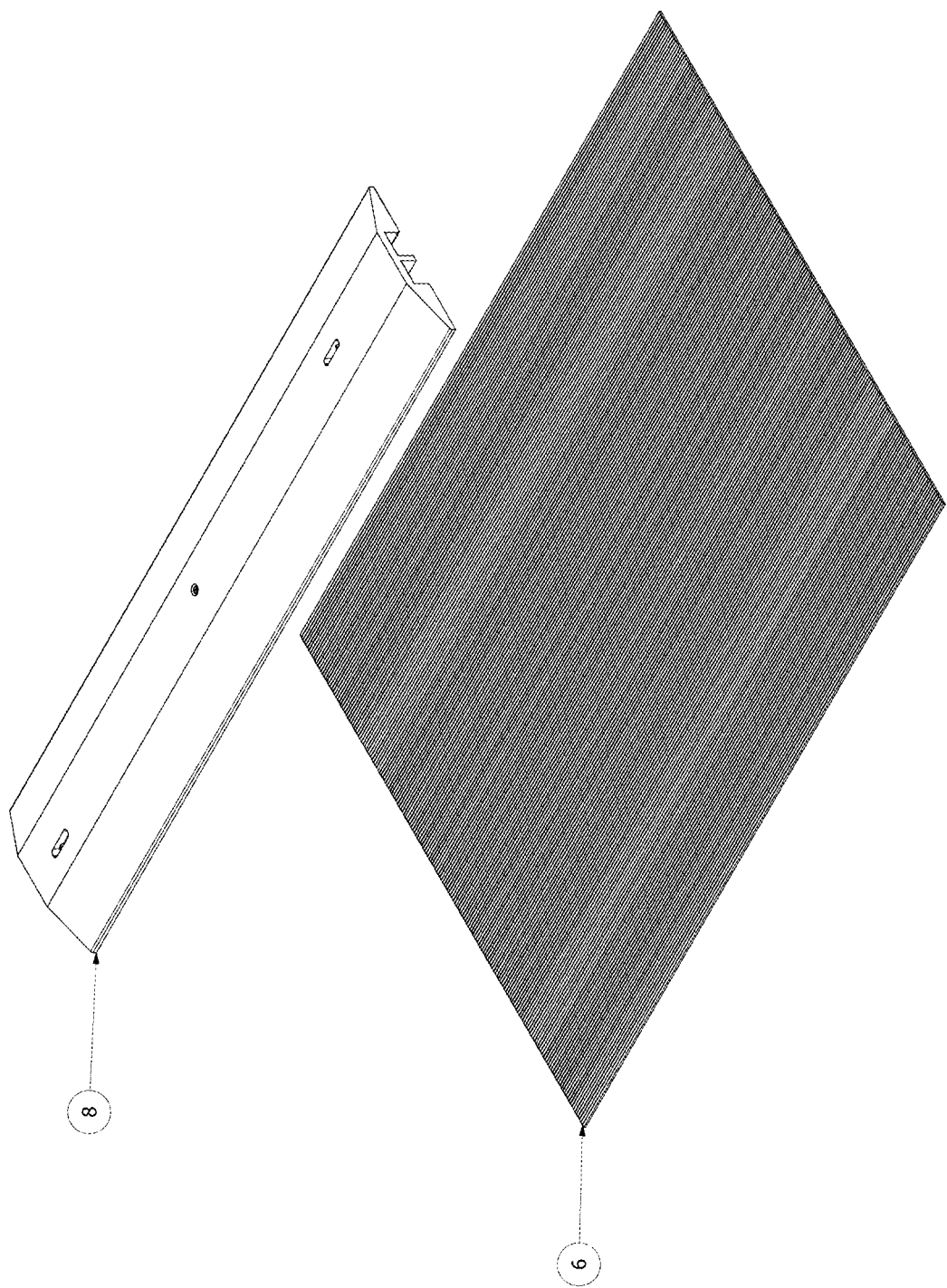
FIG. 5 shows a single spray mat.

FIG. 3 shows the extracted view of three Spray Mats 9, 10 and 11 that are connected together over the traction pad 6. FIG. 4 shows an extracted view of two Spray Mats 9 and 10 over the traction pad 6. FIG. 5 shows the single Spray Mat 8 over the traction pad 6.

Figure 6:
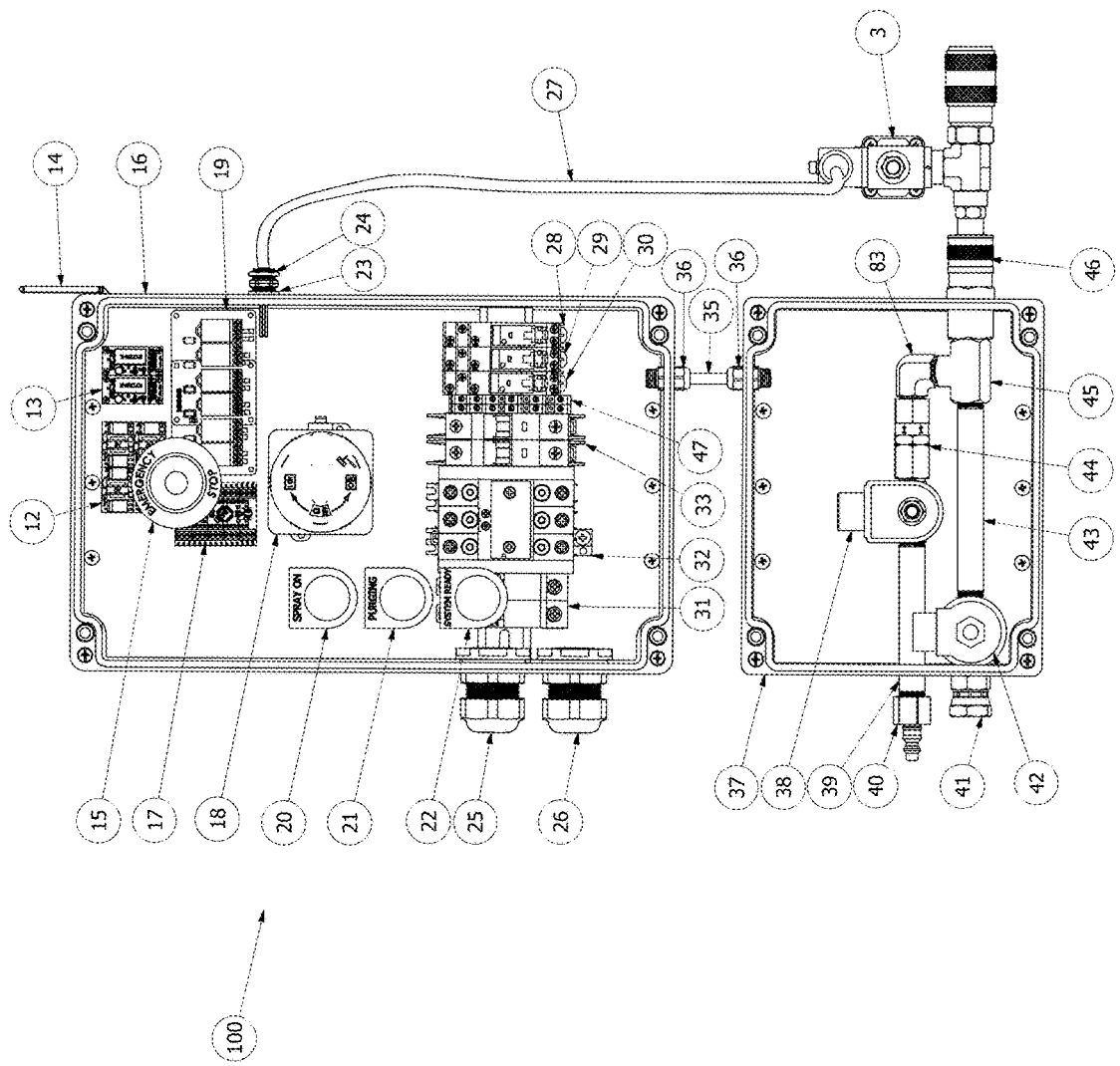
FIG. 6 shows the control panel.

FIG. 6 shows the Commercial grade control panel 1. In the preferred embodiment, the control panel 1 has an Electrical Enclosure 16 and a Mechanical Enclosure 37. The electrical enclosure 16 has the electrical components of the device 100. The Mechanical Enclosure 37 has the mechanical plumbing (motor and pump or power unit does the pumping) components of the device 100.

The electrical enclosure 16 has a DC Power Supply 12 with an Emergency Stop Switch 15. It has the CPU 17 allowing the device 100 to process the controls for the device 100. It has a Power switch 18, Relay Bank 19, a "SPRAY ON" system running indicator lamp 20, a "PURGING" system clearing water lines indicator lamp 21, and a "SYSTEM READY" system in standby and ready for operation indicator lamp 22.

A Chemical Injector Plug Male 23 and Chemical Injector Plug Female 24 connect to the Electronic Enclosure 16 through a Chemical Injector Electrical Cable 27. A Power Input Cord Grip 25 and connect the Electronic Enclosure to a power source, Motor Power Output Cord Grip 26 Connects the Electronic Enclosure to the motor. It has Chemical Injector Control Solenoid Industrial Relay 28, an Air Control Solenoid Industrial Relay 29 and a Water Control Solenoid Industrial Relay 30. The Electronic Enclosure 16 has a Power Input Breaker 31, a Motor Contactor 32, Low Amp Breakers 33 in a residential type device 100. Another embodiment, the motor 75 is directly connected to the contactor through cord grip 26.

The Electronic Enclosure 16 is connected to the Mechanical Enclosure 37 through a Mechanical to Electrical Box Data Power Cable for Solenoids 35 and a pair of Mechanical to Electrical Box Data Power Cable Cord Grip 36.

The Mechanical Enclosure 37 has an Air Control Solenoid 38, a ¼" Pipe 39, an Industry Standard Air Hose Inlet 40, a Swivel ⅜" High Pressure Power Washer Connection Input 41, a Water Control Solenoid 42, a ⅜" Pipe 43, a Check Valve ⅜" 44, a Tee 45, an Quick Disconnect 46 which are used to connect the Mechanical Enclosure 37 pressurized water source to the Chemical Injector 3 to the Mat Hose 81 to the Spray Mat 5.

Figure 7:
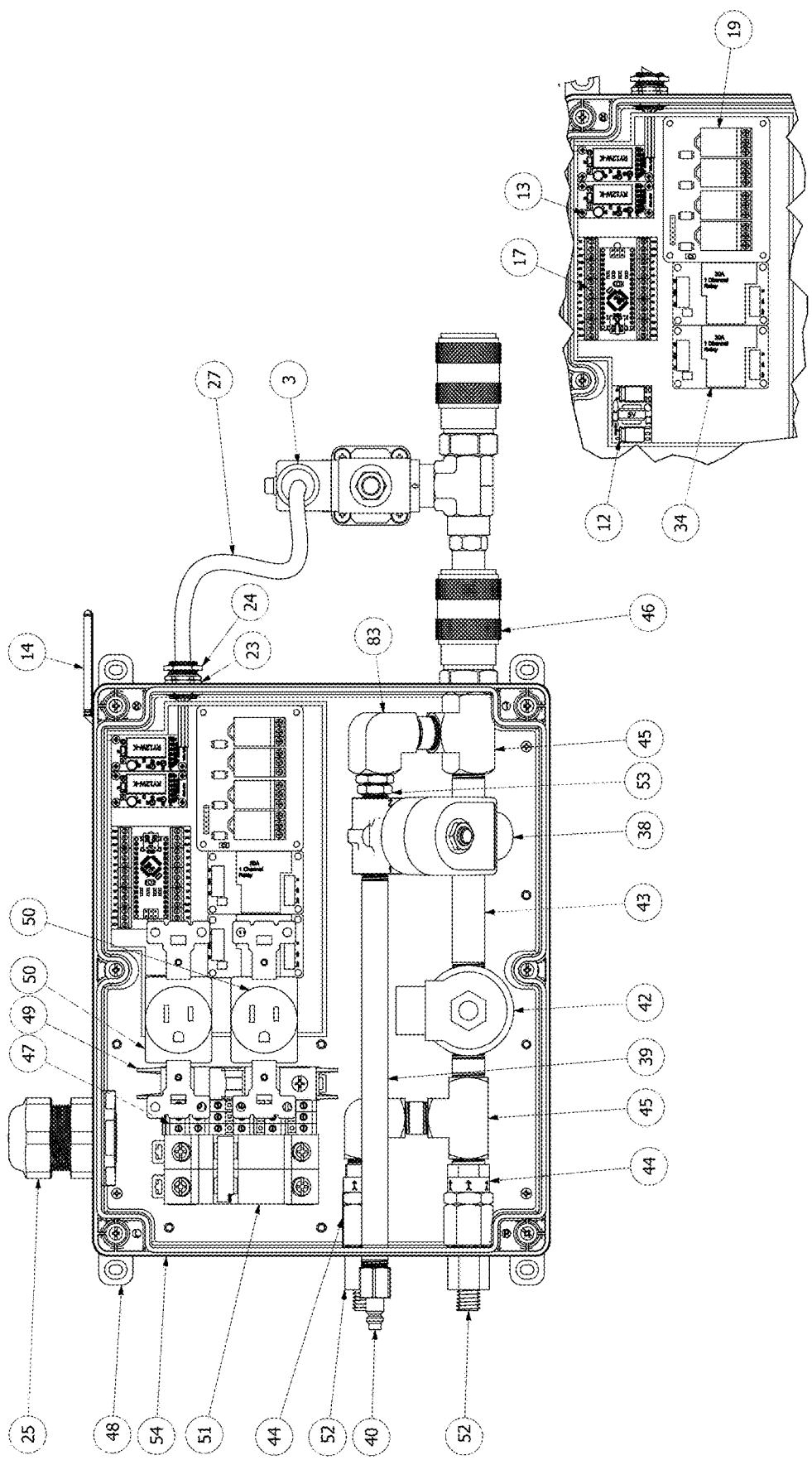
FIG. 7 displays part of the control panel.

FIG. 7 shows the Electro/Mechanical Enclosure 54 in more detail.

The Electro/Mechanical Enclosure 54 has a Low Amp Breaker 49 and a Terminal Bank 47.

The Electro/Mechanical Enclosure 54 has a Residential 5-15R Receptacle for connecting 2 pressure washers 50 with a Residential System Main System Breaker 51. The Mechanical Enclosure 37 has a Power Washer Connection Input 52. The Mechanical Enclosure 37 has Residential System Mounting Feet 48 to secure the Mechanical Enclosure 37.

Air and Water Flow Path for Residential:
pressurized water arrives through 1 or both of two Power Washer Connection Inputs 52 which connect to two Check Valve ⅜" 44. Water merges together in Tee 45 before moving through Pipe 43 into Water Control Solenoid 42. High pressure water exits the enclosure through Tee 45 and Quick Disconnect 46.

An Industry Standard Air Hose Inlet 40 connects to Pipe 39 to Air Control Solenoid 38. Air then flows through Check Valve ¼" 53 and through ⅜" 90 degree fitting 83 before connecting to Tee 45 where it exits the enclosure at Quick Disconnect 46.

Electrical Path AC and DC for Residential:

Power input comes through Cord Grip 25 before entering Residential System Main System Breaker 51. Power then goes to High Amp Relays 34, Relay Bank 19, DC Power Supply 12, and Low Amp Breaker 49. When activated by DC signals, Relay Bank 19 supplies power to Water Control Solenoid 42, Air Control Solenoid 38, and Chemical Injector Solenoid 56. When activated by DC signals High Amp Relays 34 supply power to Residential 5-15R Receptacle for connecting 2 pressure washers 50. DC power is provided by DC Power Supply 12 from Low Amp Breaker 49. DC power from Power Supply 12 feeds into CPU 17 for computing, Radio Frequency Relay Boards 13 for receiving signals from a wireless remote, High Amp Relays 34 for control of circuits, Relay Bank 19 for control of circuits, and Chemical Injector Electrical Cable 27 for automatically sensing when Chemical Injector Plug Female 24 is plugged into the Chemical Injector Plug Male 23. Terminal Bank 47 is used for miscellaneous electrical connections.

Figure 8:
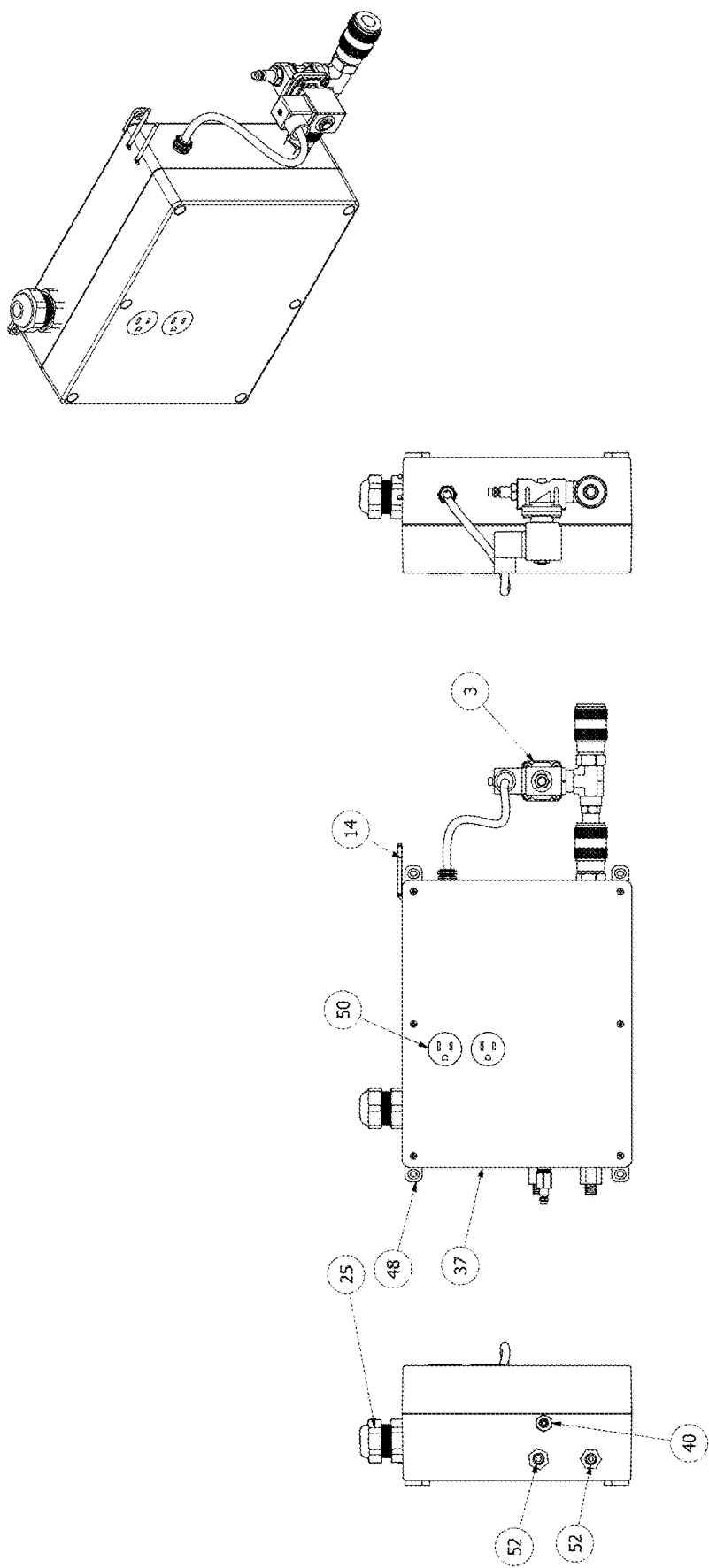
FIG. 8 shows an outside view of part of the control panel.
Figure 9:
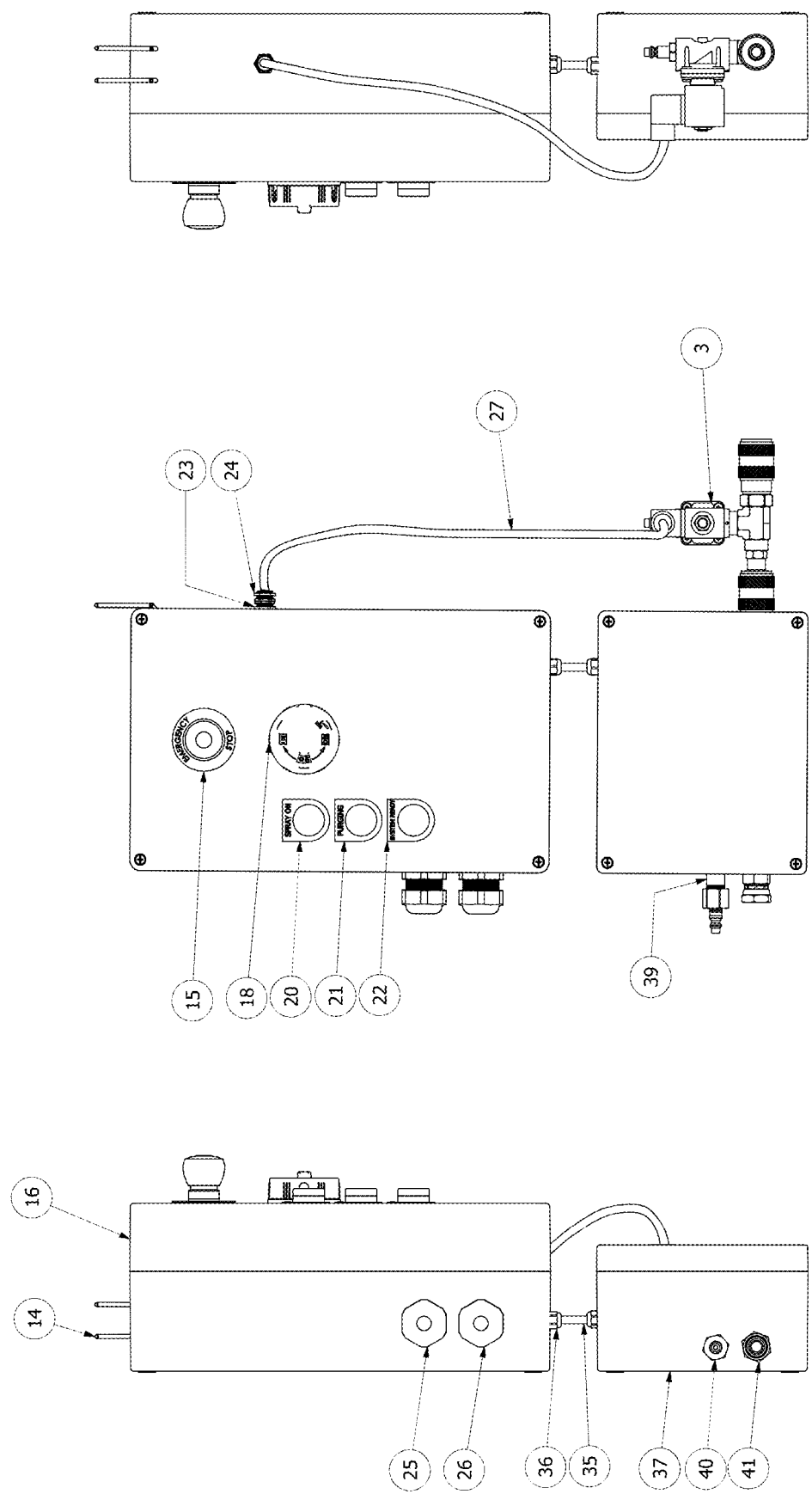
FIG. 9 displays the outside view of the control panel.

FIG. 8 shows the exterior of the Electro/Mechanical Enclosure 54 and the Chemical Injector 3. FIG. 9 shows the exterior of the Control Panel 1 and the Chemical Injector 3.

In an optional embodiments, the device 100 can use De-ice fluid to de-ice vehicles and objects, using calcium for keeping concrete walkways clear of ice FIG. 10 shows the Chemical Hose 55 where the Chemical Hose 55 connects Chemical Tank 4 to Chemical Injector Solenoid 56. The Chemical Tank 4 holds anti-icing liquid that is used for keeping the system from freezing which in the preferred embodiment only used when it is very cold for an extended period of time and there is no hot water available to run through the system. The Chemical Tank 4 has a cap and a fill opening which in the preferred embodiment is on the top of the Chemical Tank 4. The Chemical Hose 55 is connected to the Chemical Tank 4 by a removable connection means. The Chemical Hose 55 transfers the liquid from the chemical tank 4 to the Chemical Injector Solenoid 56 for transferring the anti-icing liquid to the Spray Mat 5 and Mat Hose 81 through a High Pressure Tee 45 with a High Pressure Quick Disconnect 46. The Chemical Injector solenoid 56 has a Chemical Injector Input Quick Disconnect 57. The Chemical Injector Solenoid 56 is also connected to a Chemical Injector Plug Female 24 and a Chemical Injector Plug Male 23 to connect to the control panel 1.

Figure 11:
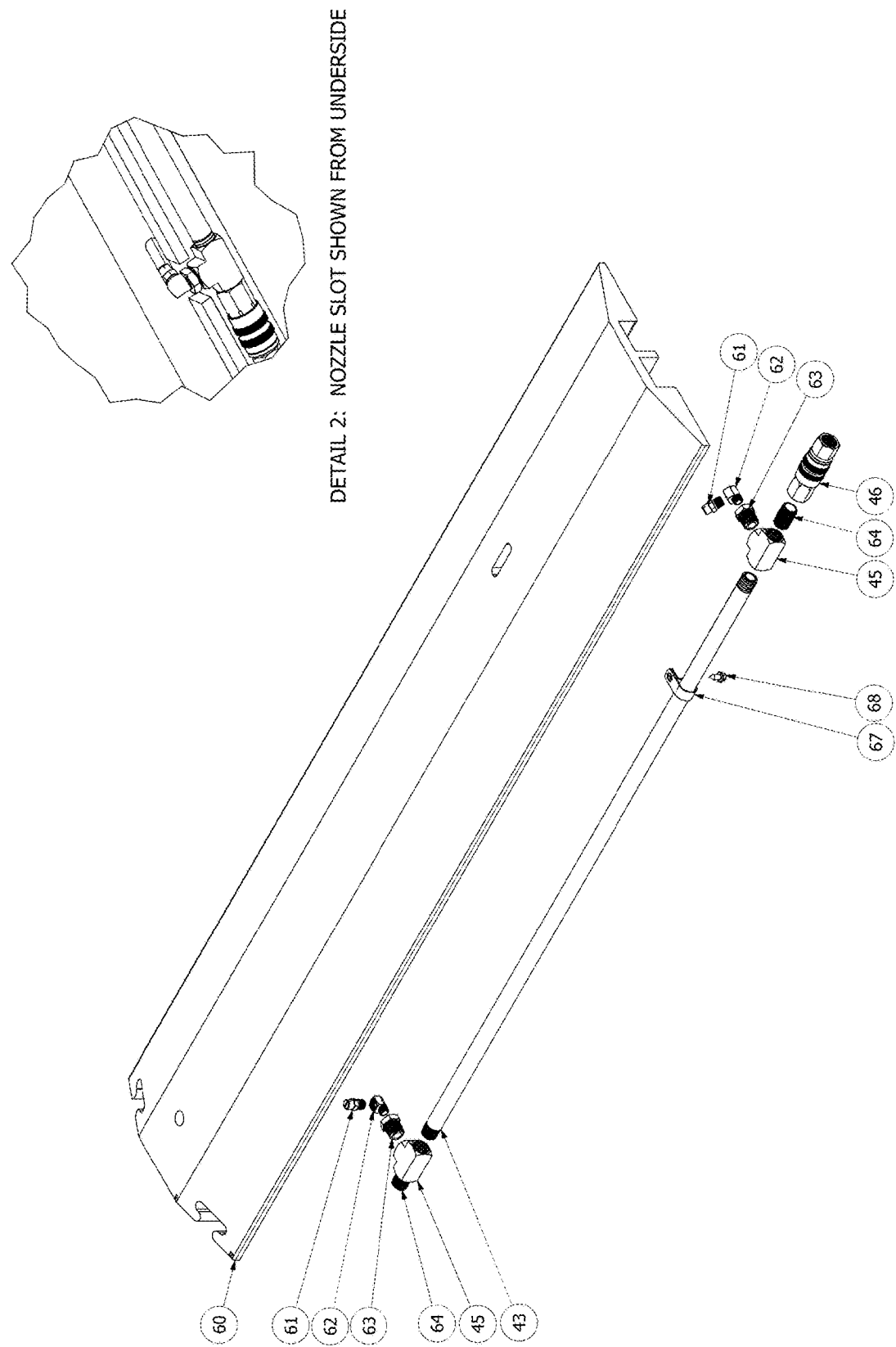
FIG. 11 shows the spray mat.

FIG. 11 shows a Spray Mat 11 and its components.

The Control Panel 1 will contain that electronics and mechanics that control the functionality of the device 100. The Control Panel 1 will have one or more Radio Antenna(s) 14 that will allow wireless control with Radio Frequency Relay Boards 13. It will have an emergency shut off button 15. The control panel 1 will have a CPU 17 that controls the actions and functions of the device 100.

Air and Water Flow Path:

Pressurized water enters Mechanical Box 37 at Swivel Power Washer Connection Input 41 which is connected to Water Control Solenoid 42. Water then flows through Pipe 43 and Tee 45 before exiting the system through Quick Disconnect 46.

An Industry Standard Air Hose Inlet 40 connects to Pipe 39 to Air Control Solenoid 38. Air then flows through Check Valve ⅜" 44 and through ⅜" 90 Degree Fitting 83 before connecting to Tee 45 where it exits the enclosure at Quick Disconnect 46.

Electrical Path AC and DC:

AC:

Power input comes through Cord Grip 25 before entering Power Input Breaker 31. Power then goes to Power Switch 18 which feeds Motor Contactor 32, and Low Amp Breakers 33. Power output from Motor Contactor 32 goes through Cord Grip 26 to the Electric Motor with supporting equipment 75 or the end users supplied pressure washer. Power output from breaker 33 goes to Chemical Injector Control Solenoid Industrial Relay 28, Air Control Solenoid Industrial Relay 29, Water Control Solenoid Industrial Relay 30, Relay Bank 19, and DC Power Supply 12. Upon receiving a DC signal from CPU 17, Relay Bank 19 supplies AC signal to Chemical Injector Control Solenoid Industrial Relay 28, Air Control Solenoid Industrial Relay 29, and Water Control Solenoid Industrial Relay 30, SPRAY ON indicator lamp 20, PURGING indicator lamp 21, SYSTEM READY indicator lamp 22, and Motor Contactor 32. Terminal Bank 47 is used for miscellaneous electrical connections.

DC:

DC power is provided by DC Power Supply 12 from Low Amp Breakers 33. DC power from Power Supply 12 feeds into CPU 17 for computing, Radio Frequency Relay Boards 13 for receiving signals from a wireless remote, Relay Bank 19 for control of circuits and Chemical Injector Cable 27 for automatically sensing when Chemical Injector Plug Female 24 is plugged into the Chemical Injector Plug Male 23.

Figure 12:
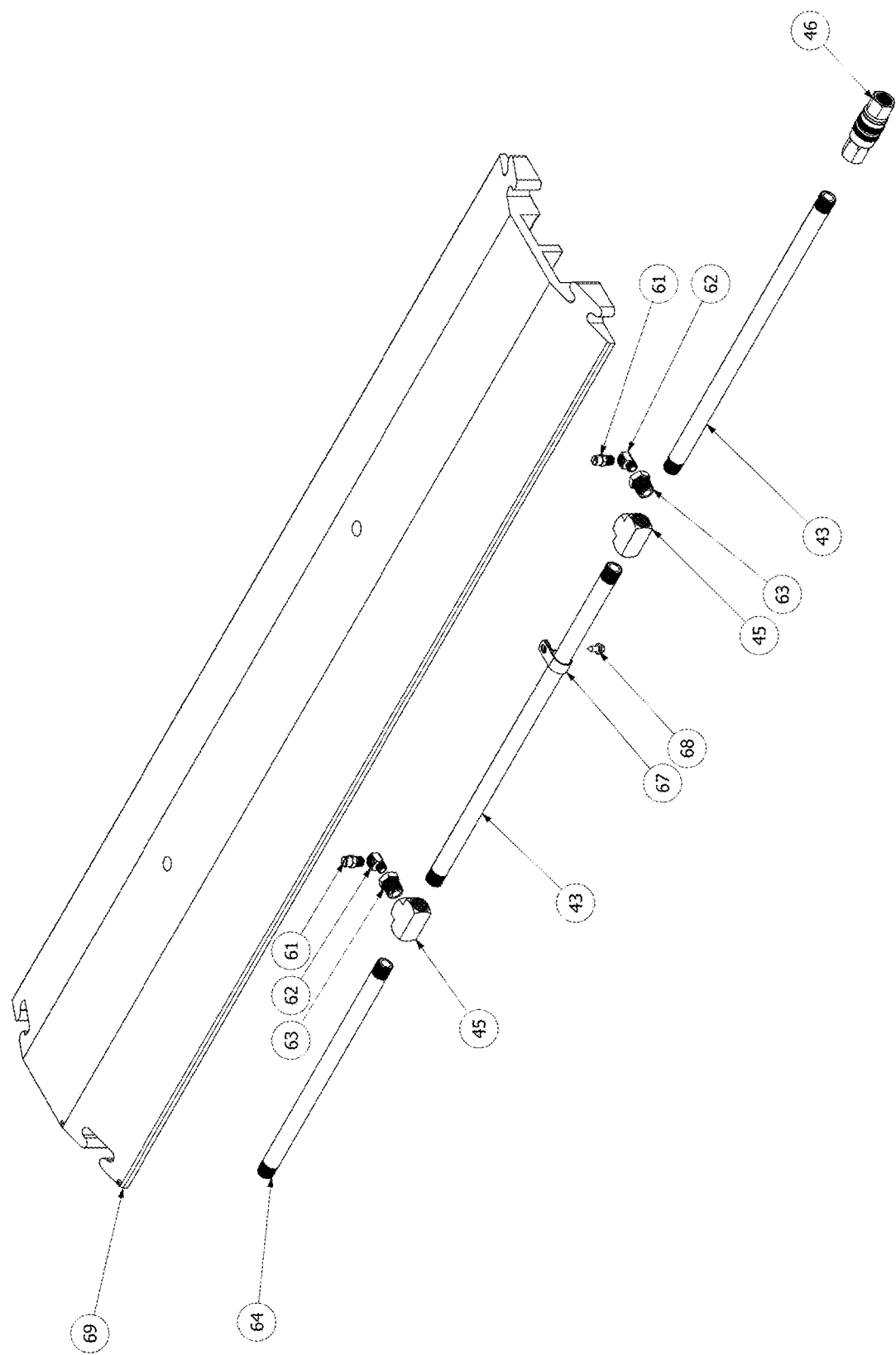
FIG. 12 shows the spray mat and pipe.
Figure 13:
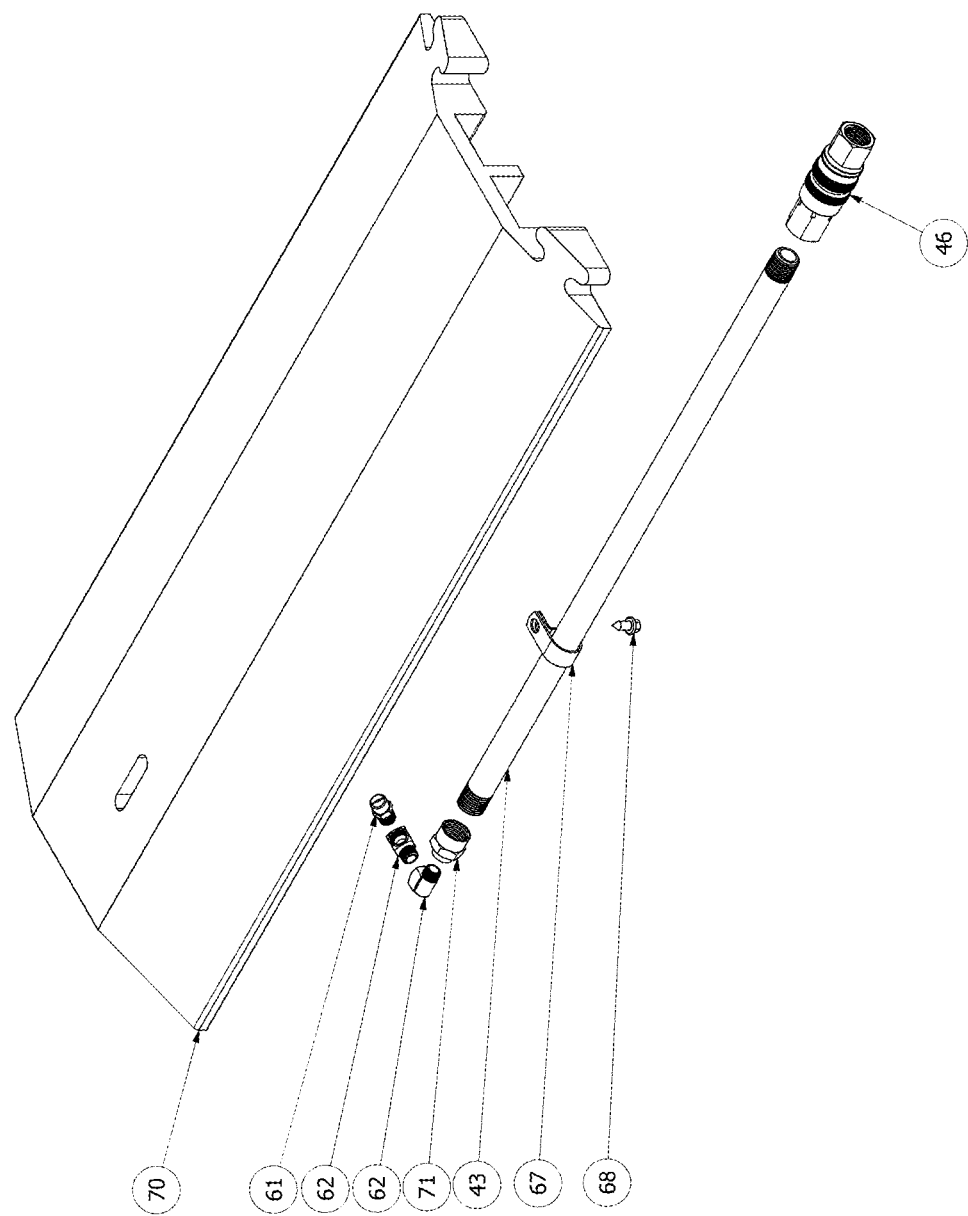
FIG. 13 is another view of the spray mat and pipe.

FIGS. 11, 12, and 13 displays the spray mat assembly 5.

FIG. 11 shows a single Spray Mat 5 is comprised of a Pro Mat Module 1 60 which has a plurality of openings for a plurality of Spray Nozzles 61 through which the water and Anti-Icing Fluid sprays out from to spray the undercarriage of a Vehicle 200. The Pro Mat Module 1 60 has a channel on its bottom where a. Hose 81 Connects to Quick Disconnect 46. The piping assembly underneath the mat consists of a Bushing 64 that Quick Disconnect 46 and Tee 45, Reducer Fitting 63 connects to Tee 45 on one side, which then connects to ⅛ " 90 Degree Fitting 62 which allows Spray Nozzle 61 to be at an angle. The remaining connection to Tee 45 is used to attach pipe 43. ⅜" Pipe 43 connects to Tee 45 at the other end of the mat. Reducer Fitting 63 connects to Tee 45 on one side, which then connects to ⅛ " 90 degree fitting 62 which aims the spray nozzle vertically. At the end of Module 1 connected to Tee 45 is Bushing For Connecting To Next Mat Module or end plug 64. In the preferred embodiment, the ⅜" Pipe 43 is secured to the Pro Mat Module 1 60 using a Galvanized Pipe Clamp 67 using a sheet Metal Screw stainless 68 or other connection means.

FIG. 12 shows a Spray Mat 5 with multiple ⅜" Pipe 43 and multiple Spray Nozzles 61 with a Pro Mat Module 2 69. Tee 45 end can be capped Bushing For Connecting Next Mat Module OR End Plug 64.

Pro Mat Module 2 connects to Pro Mat Module 1 using Quick Disconnect 46 if Pro Mat 1 has the Bushing For Connecting To Next Mat Module 64 installed. At the end of Module 2 connected to Tee 45 is Bushing For Connecting Next Mat Module OR End Plug 64.

Beneath the mat modules is the Traction Pad 6. The mat module has two angled vertical sides which allows vehicles to drive over the pipe protector 60, 69, 70, and/or 72 depending on configuration and pro/res. The traction Pad 6 is a rectangular mat that extends out from the sides of the pipe protector 60,69,70, and/or 72 depending on configuration and pro/res. The traction pad 6 is made of a material like rubber to give vehicles traction as they drive over the Spray Mat 5.

Multiple Spray Mats 5 can be connected together to increase the area covered by the device 100 as shown in the Figures. This also allows the device 100 to be portable. The Spray Mat 5 can be connected together through connection tabs which are at the ends of the Pro Mat Module 69. In the preferred embodiment, these tabs are also on Module 1 and 3 but just on one end. The tabs one end fit into slots of the Spray Mat 5 that it is being connected to. The pipe 43 of one Spray Mat 5 connects the quick disconnect 46 of the next Spray Mat 5 module 46. FIG. 13 displays the Pro Mat Module 3 70 which is used as an end module for configuration with multiple Spray Mats 5.

Figure 14:
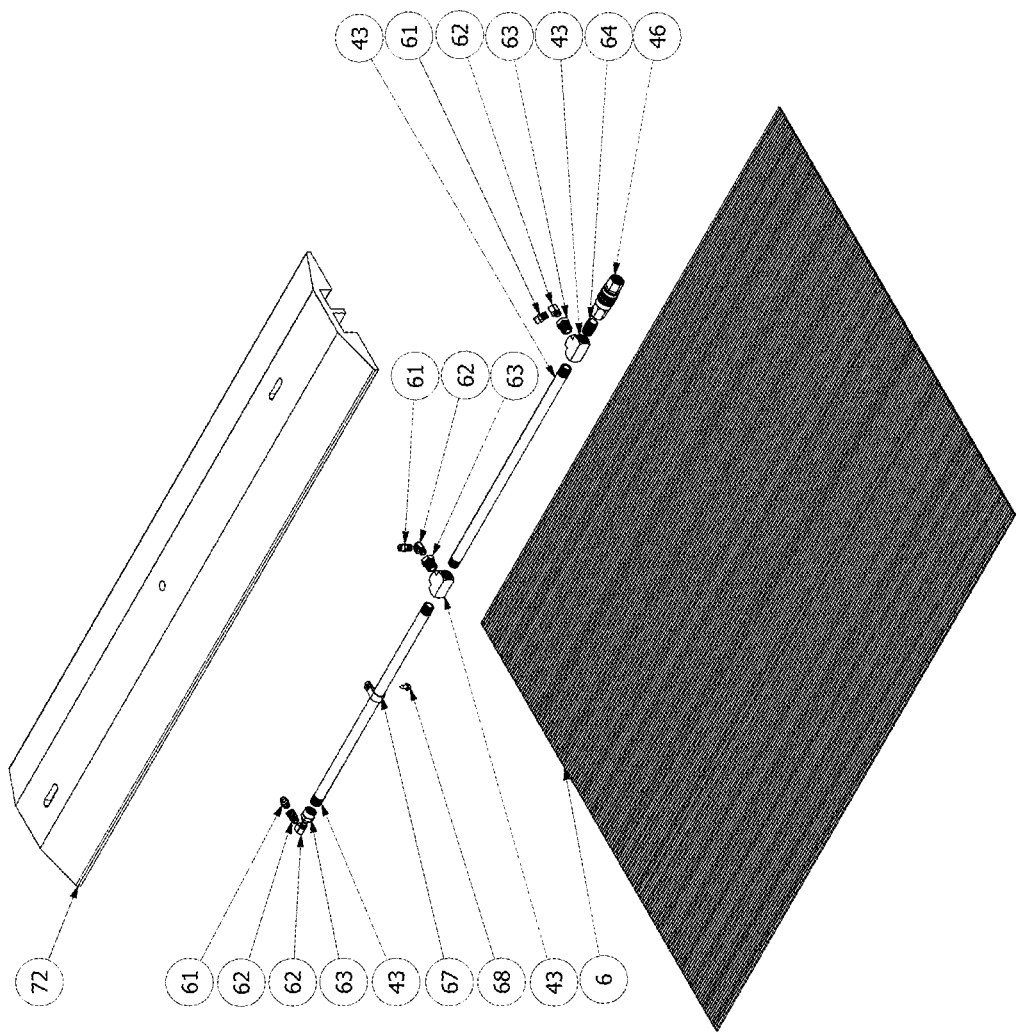
FIG. 14 shows the spray mat, pipe and traction pad.

FIG. 14 shows the Spray Mat 8 above the traction pad 6.

Figure 15:
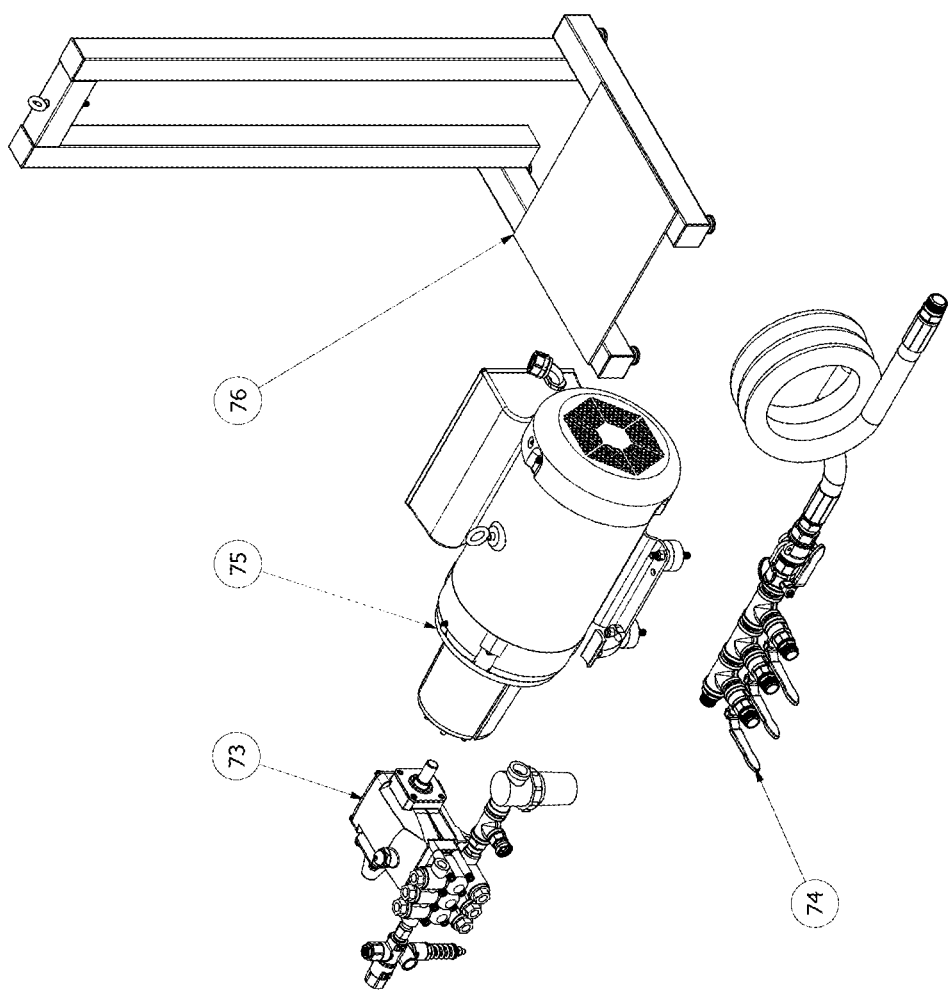
FIG. 15 shows the Power Unit OR Pump and Motor and support rack.

FIG. 15 displays additional components that can be used with the device 100. The device 100 can be loaded onto a Mounting Frame Steel weldment frame 76 for mounting a power unit and control panel 1. A Pump With Supporting Equipment 73 connected to a motor with Supporting Equipment 75. The Pump With Supporting Equipment 73 is connected to a water Inlet Manifold 74 which connects to the power washer connection input 41.

The following is the operation of the device system:

Setup:

Connect the device 100 to a power source, connect the device 100 to a pressurized water source using the supplied power unit 73, 74, 75, or end users preexisting pressure washer. Connect Chemical Injector 3 to Quick Disconnect 46 and Chemical Injector Plug Male 23. Connect Mat Hose 81 to quick connect 46 on the Chemical Injector or connect directly to Quick Disconnect 46 on Mechanical Box 37 if Chemical Injector is not used. Run Mat Hose 81 out of the building and on to the driveway, connect Mat Hose 81 to Quick Disconnect 46 on the Spray Mat 5.

Next, set the Spray Mat 5 in position that is easy to drive over. The device 100 is now ready to use.

The device 100 is turned on, the control panel 1 opens the Water Control Solenoid 42 and activates Motor Contactor 32, water flows from Water Inlet Manifold 74 through the Pump With Supporting Equipment 73. Motor with Supporting Equipment 75 powers the pump and high pressure water is sent into swivel Power Washer Connection Input 41 into Mechanical Enclosure 37. Water flows out of Quick Disconnect 46 from Mechanical Enclosure 37 and through the optional Chemical Injector 3 before entering Mat Hose 81. From here the water is sent out to the Spray Mat 5. The device 100, sprays high pressure water upwards to clean bottom and sides of vehicle, the device 100 will be turned off either manually or automatically at a set time.

In the preferred embodiment, the device 100 will shut off the Water Control Solenoid 42 and Motor Contactor 32 and open the Air Control Solenoid 38. The device 100 purges all the water out of the device 100 so that the device 100 can be left outside during winter months without the issue of freezing the lines. The Chemical Injector 3 is used to improve the quality of the purging process by injecting an environmentally friendly anti-icing mixture into the lines and spray mat during the purging process.

A user can press the ON button again to restart the spraying at any time including during the purge cycle, if the ON button is pressed while the system is already spraying, the set amount of time before the system automatically enters the purge process is reset, but the purging cannot be overridden to move the device 100 to an idle state, in order for the device 100 to go to the idle state the entire purge cycle must be completed. This is done to protect the device 100 from being damaged by freezing water. After a set period of purging time the device 100 moves back to the idle state where it waits for an ON input to restart the process.

The device 100 can be controlled wirelessly using a wireless remote that will connect to the Radio Frequency Relay Boards 13. The end user can connect dozens of remotes to the device in order to accommodate large fleets of vehicles.

Figure 16:
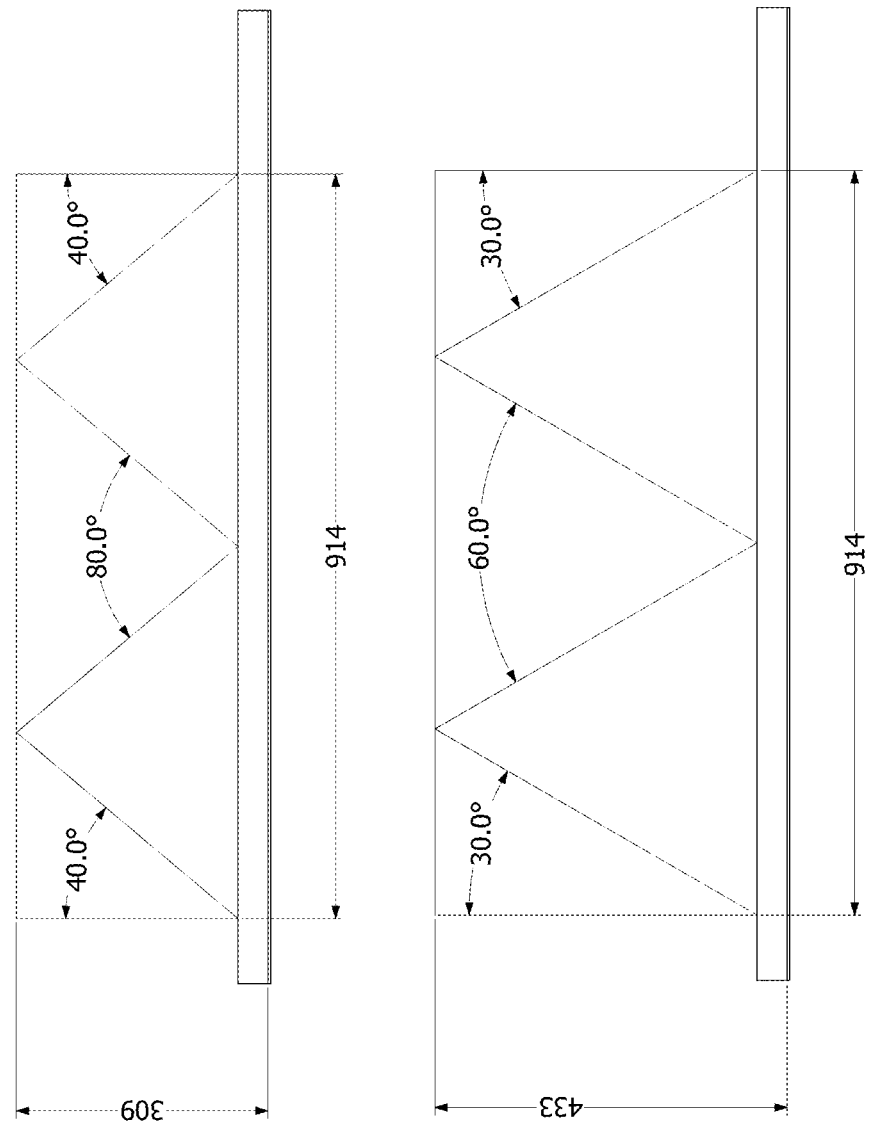
FIG. 16 shows the angle of spray by the device.

Operation:

FIG. 16 shows the angles of the spray from a single spray mat which is a 60 degree spray in the middle and 30 degree spray towards the center at the end. The spray can also be at an 80 degree spray in the middle and an 40 degree spray towards the center at the end with a spray that sprays out at a range is 12" to 33".

Figure 17:
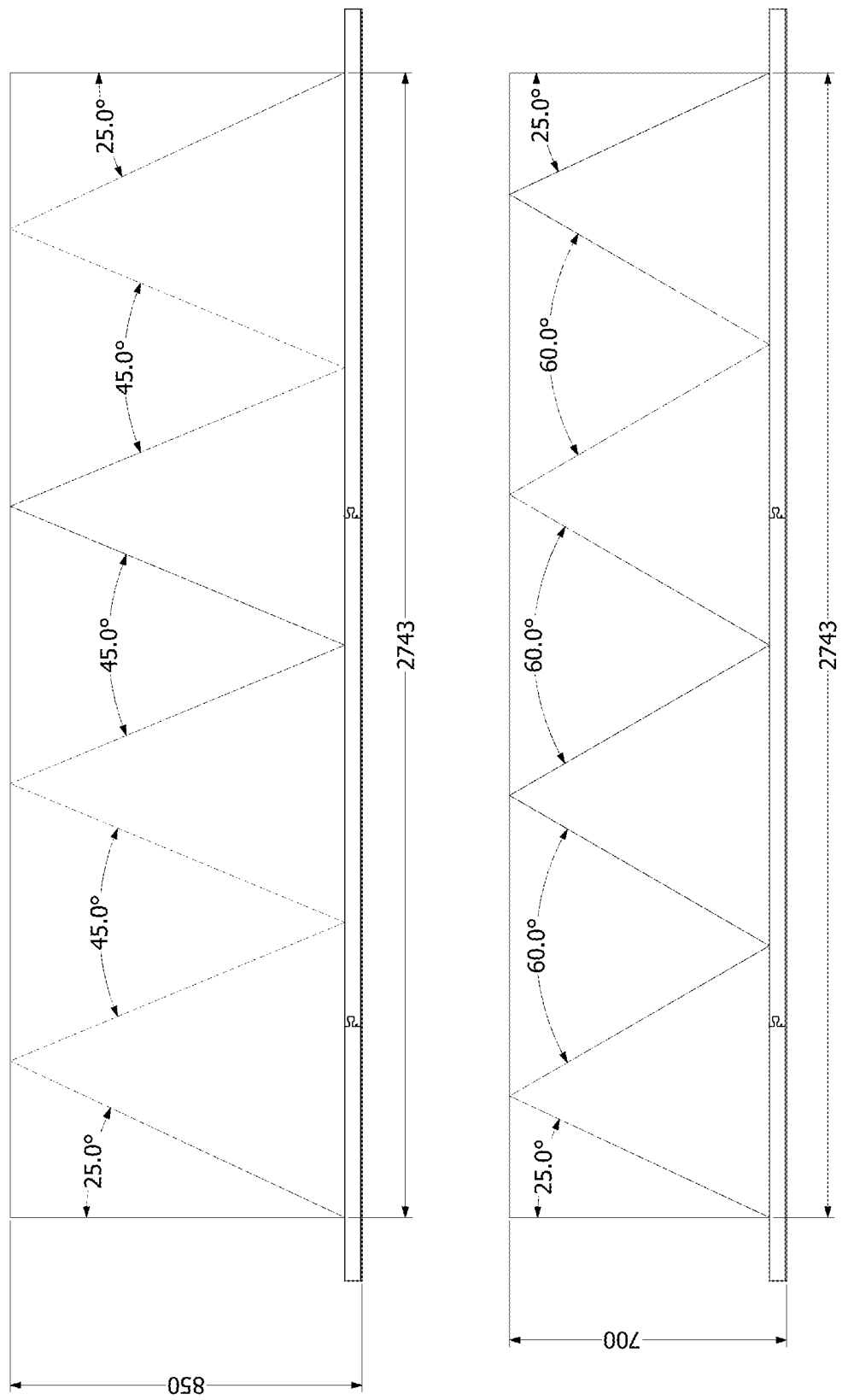
FIG. 17 shows the angle of spray for multiple Spray Mats.

FIG. 17 shows the angles of the spray from a multiple spray mat which is a 60 degree spray in the middle and a 25 degree spray towards the center at the end. The spray can also be at an 45 degree spray in the middle and a 25 degree spray towards the center at the end.

Figure 18:
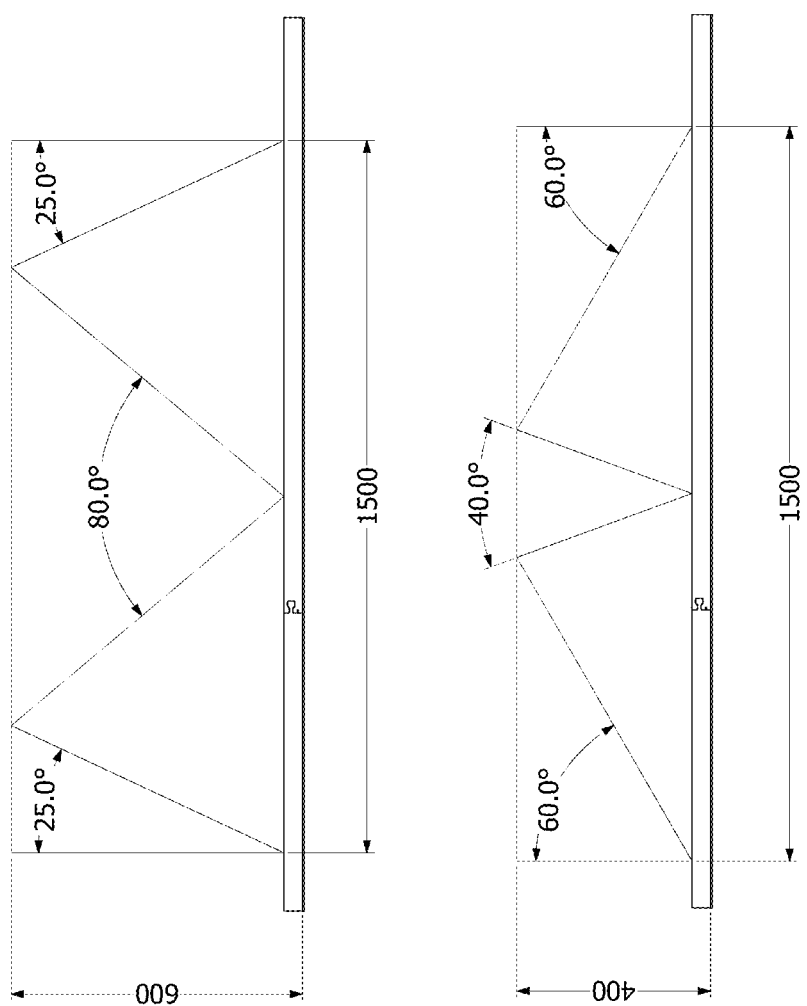
FIG. 18 show different possible spray angles.

FIG. 18 shows an alternative embodiment where the angles of the spray from a single spray mat which is an 80 degree spray in the middle and a 25 degree spray towards the center at the end. The spray can also be at a 40 degree spray in the middle and a 60 degree spray towards the center at the end.

Figure 19:
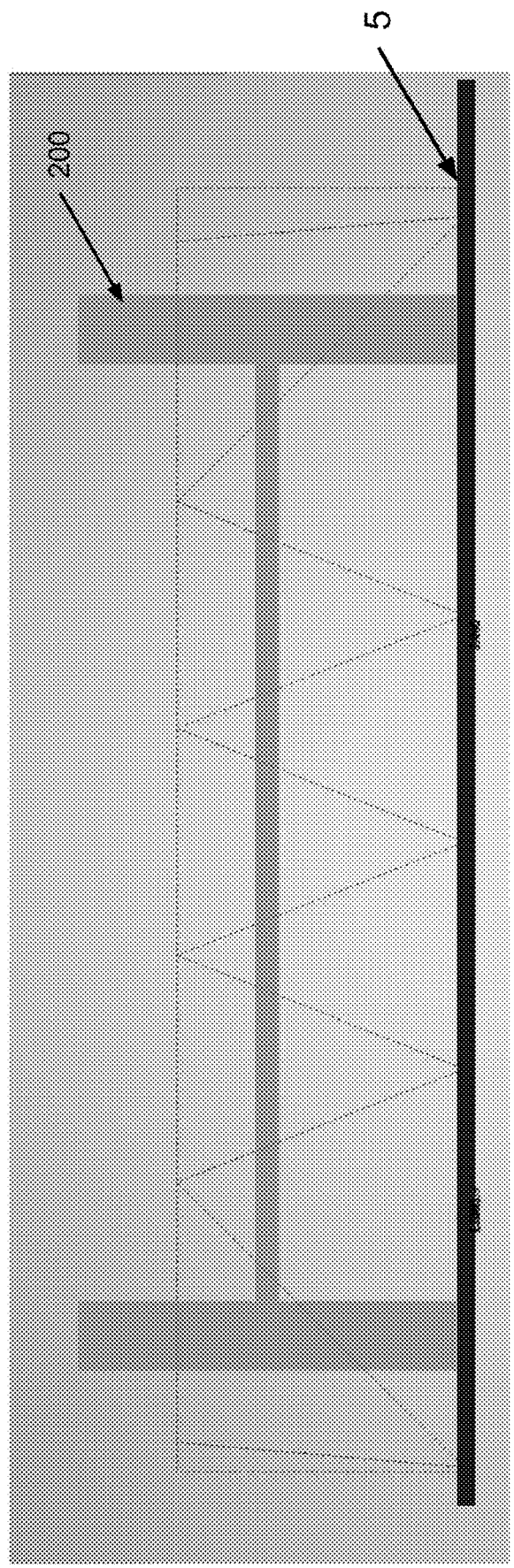
FIG. 19 shows the 9 foot spray mat being used with a commercial truck.

FIG. 19 shows a Vehicle 200 going over a commercial version of the device 100 which consists of multiple Spray Mats 5. The Vehicle 200 goes over the multiple Spray Mats 5.

Figure 20:
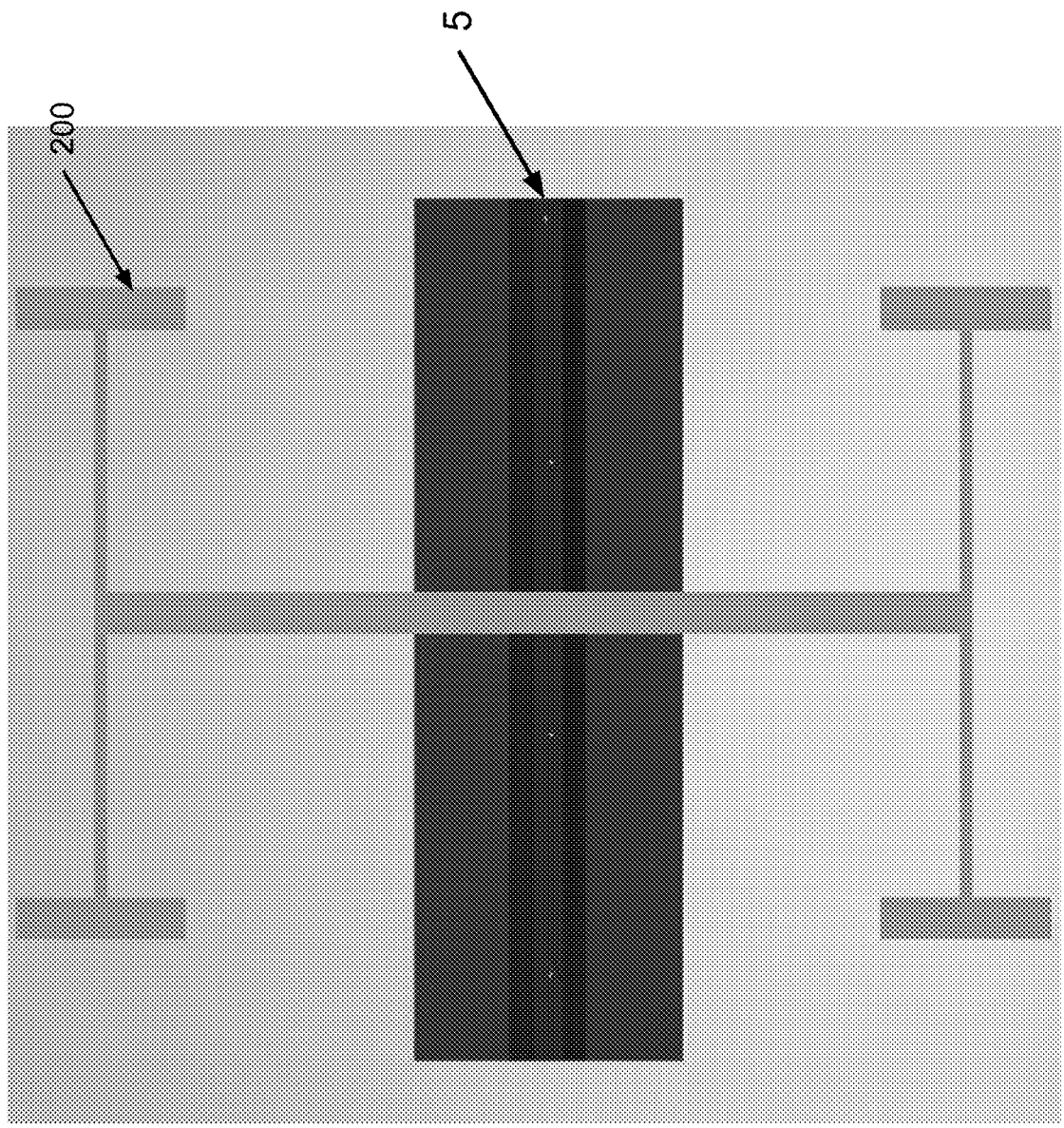
FIG. 20 shows an overview view of the spray mat being used.
Figure 21A:
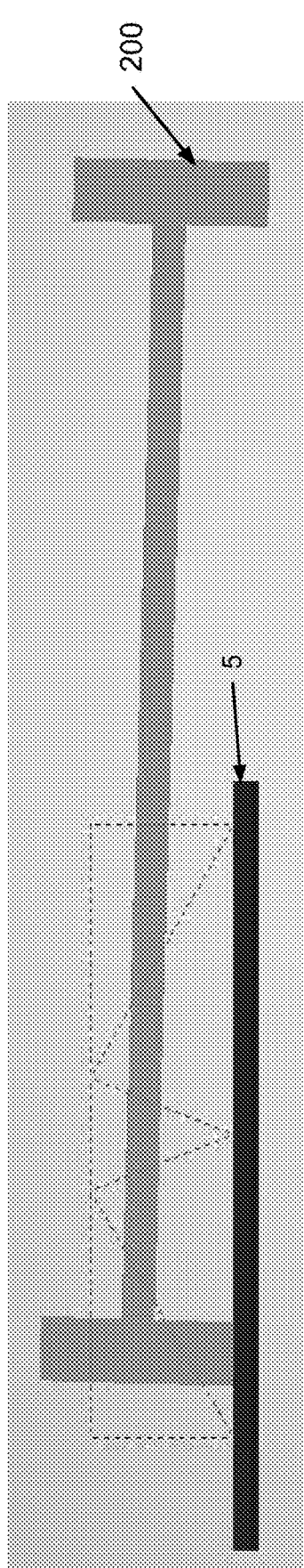
Figure 21B:
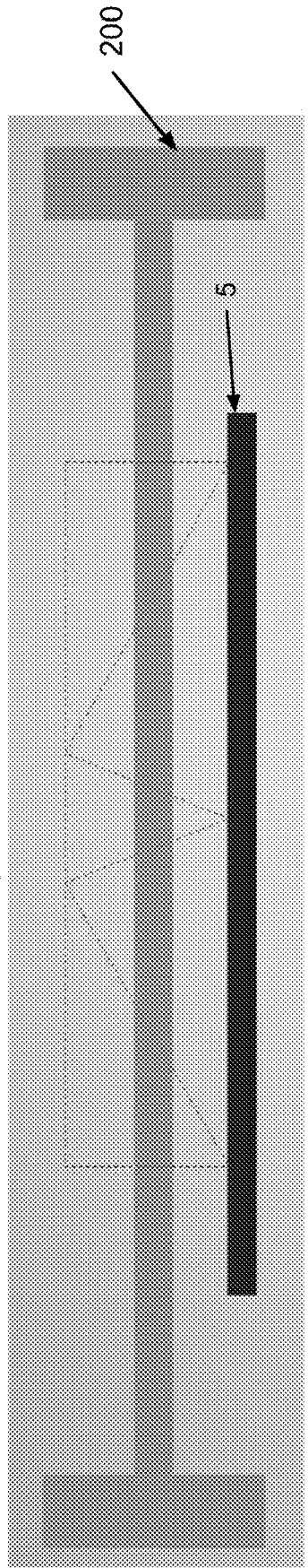
Figure 21C:
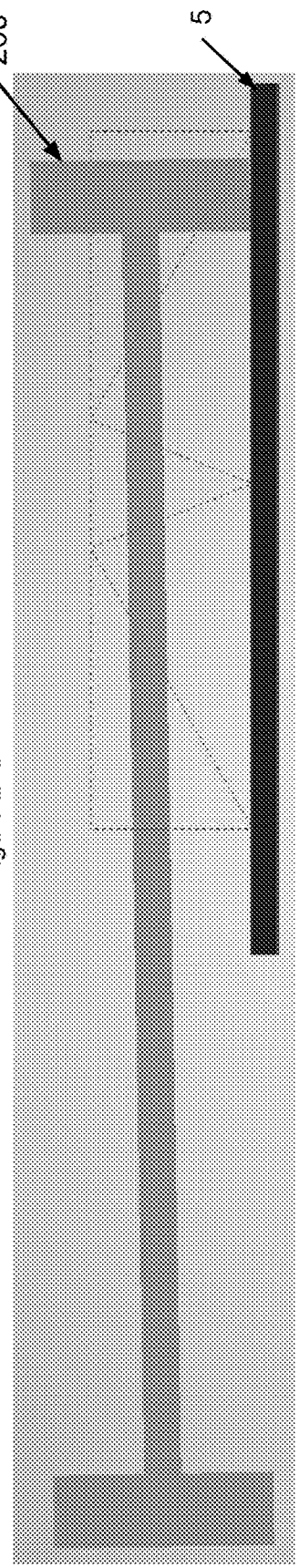
Figure 22A:
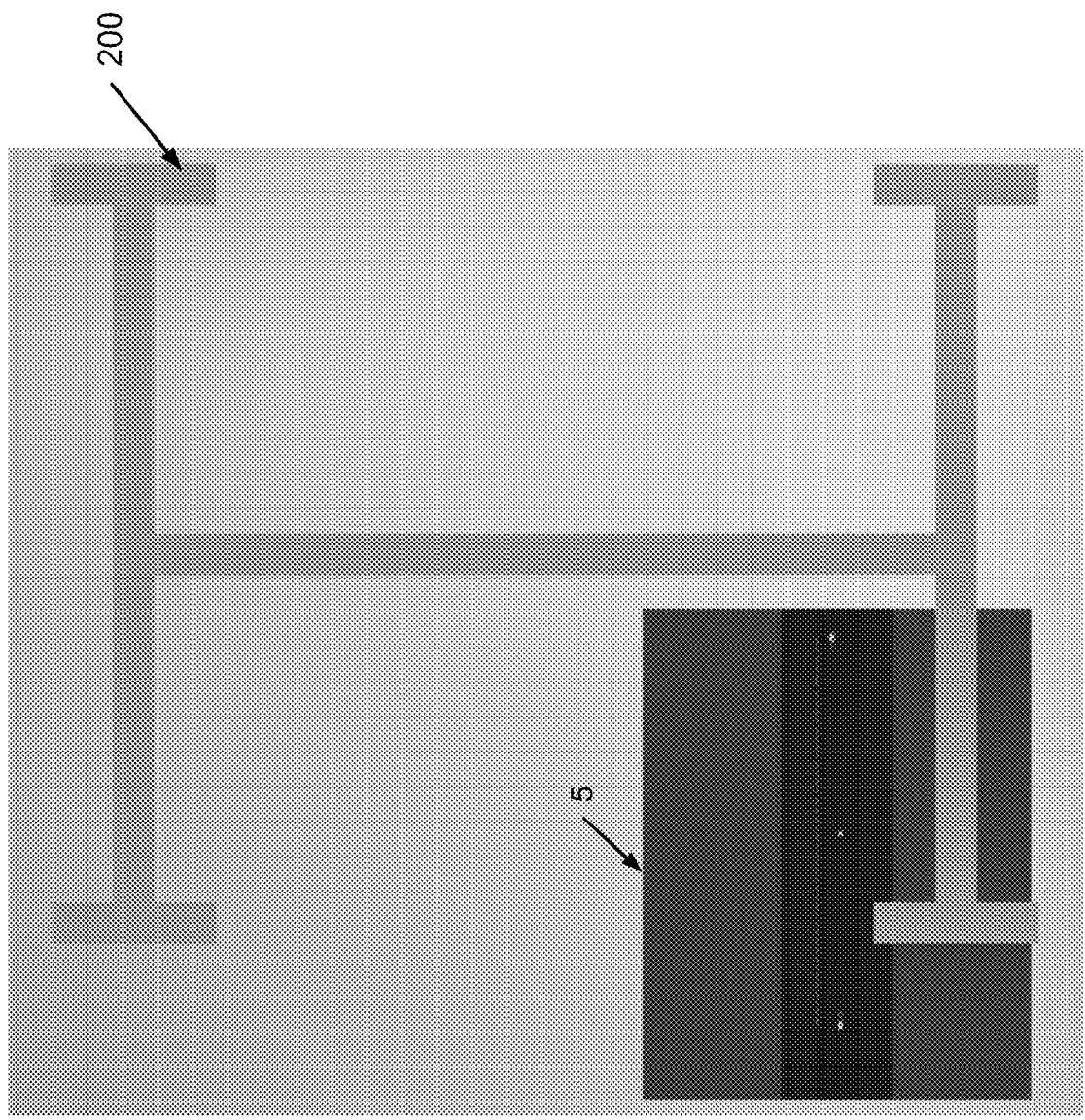
Figure 22:
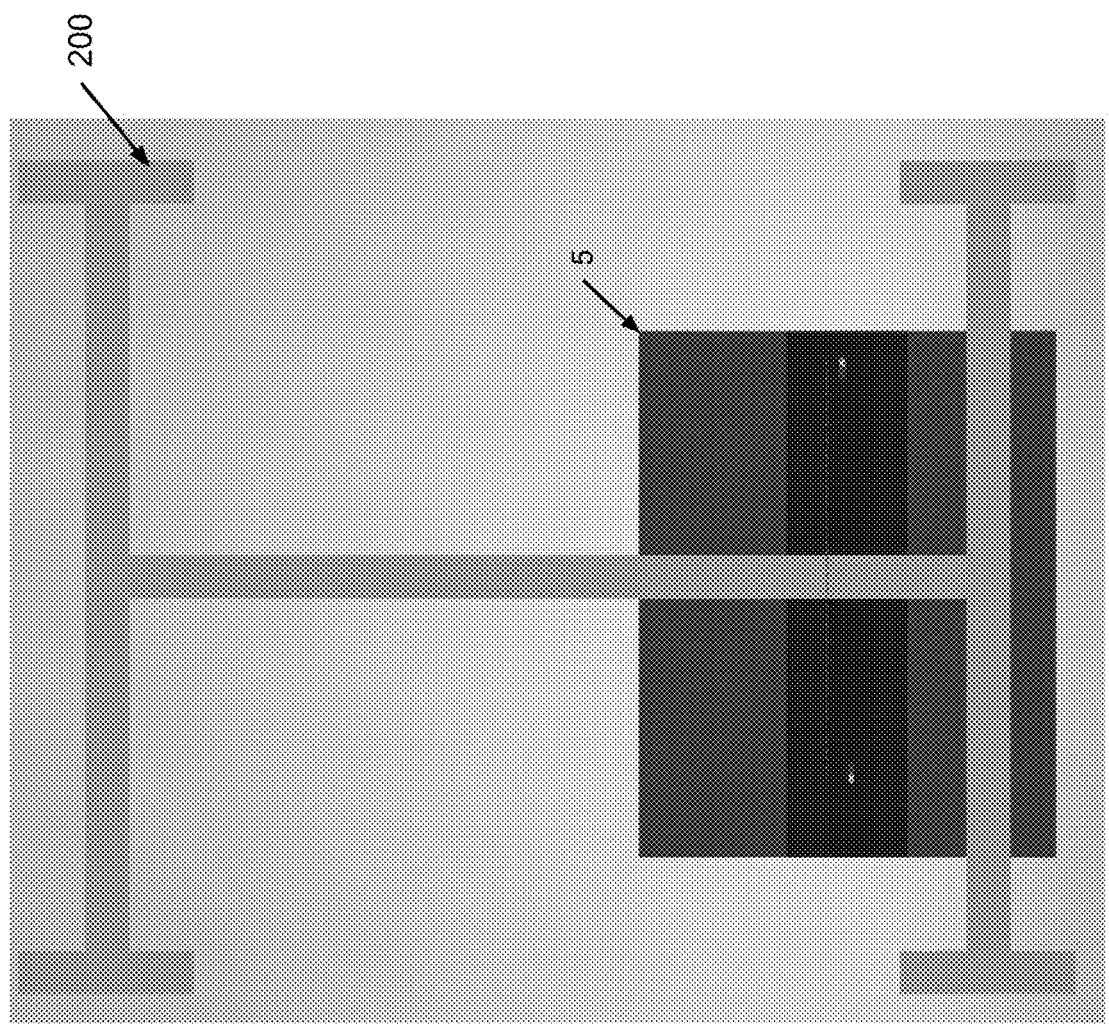
Figure 22:
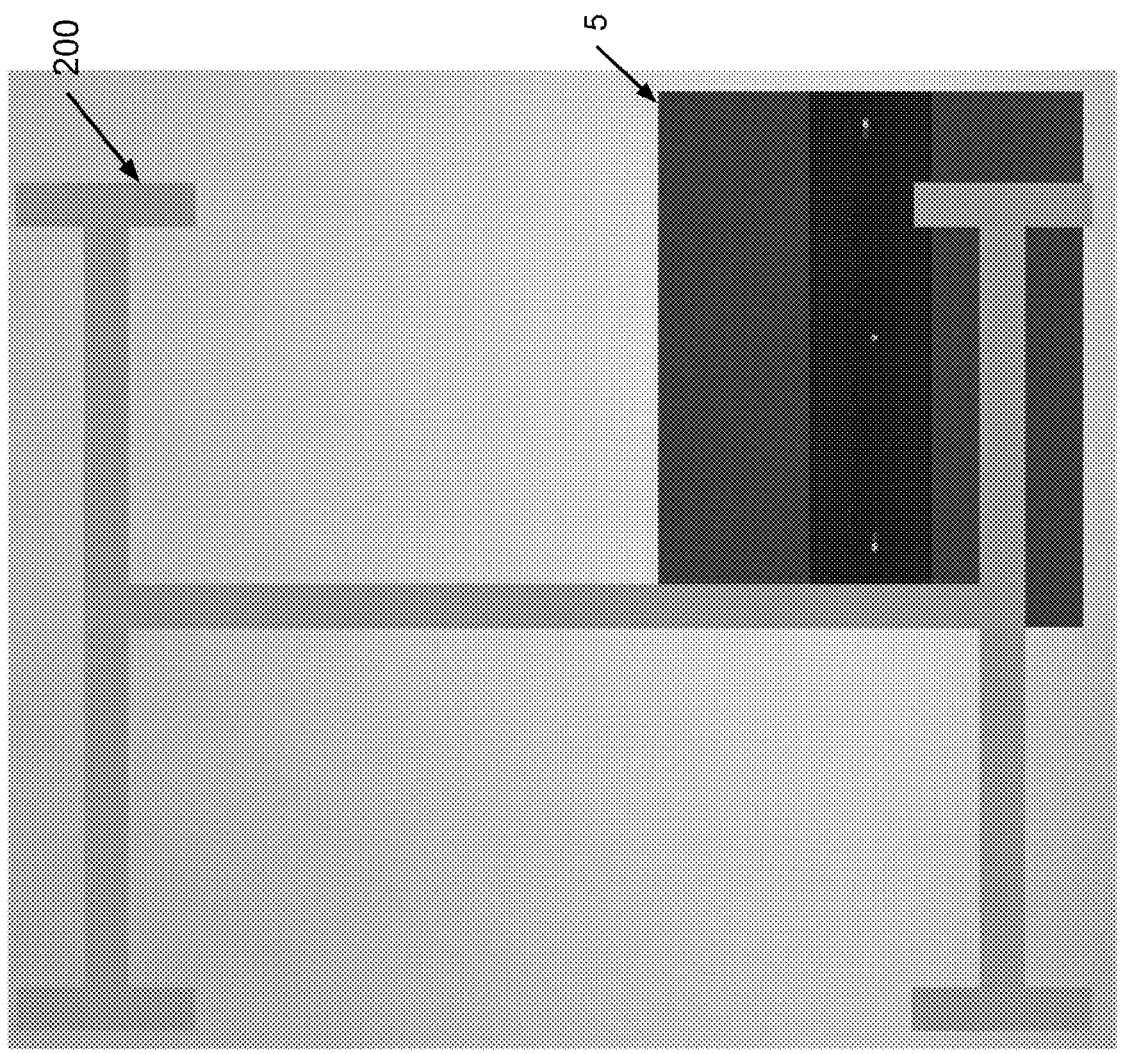

FIG. 20 shows an overview of this configuration. FIG. 21 shows a residential version of the device 100 which consists of a single Spray Mat 5. A Vehicle 200 may have to do three passes to do a complete cleaning. FIGS. 22a, 22b and 22c shows an overview of the process.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur by those skilled in the art, it is not desired to limit the invention to the exact construction and operation shown and described, and accordingly, all suitable modifications and equivalents may be resorted to, falling within the scope of the invention.

I claim:

1. A device comprising;
An Electro/Mechanical System control panel, a Mat Hose, a plurality of Spray Mats, and a Traction Pad where the spray mats run over the traction pad, where a water source is connected to the Electro/Mechanical System control panel, the mat hose connects the Electro/Mechanical System control panel to the mat hose, where the mat hose connects to the spray mat where the spray mat has a plurality of spray nozzles, and having the spray mats comprised of a Mat Module has a channel on its bottom where a pipe assembly runs.

2. A device according to claim 1 where the water source is a pressure line.

3. A device according to claim 1 having a Mounting frame.

4. A device according to claim 1 where the pipe assembly consists of a Bushing that has a Quick Disconnect and Tee with a Reducer Fitting connecting to the Tee on one side, which then connects to ⅛ " 90 Degree Fitting which allows Spray Nozzle to be at an angle with the remaining connection to Tee attaches the pipe.

5. A device according to claim 1 further a plurality of spray mats can be connected together.

6. A device according to claim 1 further comprising having a pump connected to the Electro/Mechanical System control panel.

7. A device according to claim 1 further comprising having mat module having two angled vertical sides which allows vehicles to drive over the pipe protector.

8. A device according to claim 1 further comprising having a chemical hose connects a chemical tank to a chemical injector solenoid.

9. A device according to claim 8 further comprising where the chemical hose transfers liquid from the chemical tank to the chemical injector solenoid to the spray mat and mat hose through a high pressure tee with a high pressure quick disconnect.

10. A device according to claim 9 further comprising where the liquid is de-ice fluid.

11. A device according to claim 1 further comprising where angles of the spray from a spray mat is a 60 degree spray in the middle and 30 degree spray towards the center at the end.

12. A device according to claim 1 further comprising where angles of the spray from a spray mat is an 80 degree spray in the middle and an 40 degree spray towards the center at the end.

13. A device according to claim 1 further comprising where angles of the spray from a spray mat is a an 80 degree spray in the middle and a 25 degree spray towards the center at the end.

14. A device according to claim 1 further comprising where angles of the spray from a spray mat is a 40 degree spray in the middle and a 60 degree spray towards the center at the end.

* * * * *